United States Patent [19]  
Niwa et al.

[11] Patent Number: 4,515,716  
[45] Date of Patent: May 7, 1985

[54] 2,6-DIAMINOPYRIDINE-BASED AZO DYES FOR CELLULOSE-CONTAINING FIBERS

[75] Inventors: Toshio Niwa; Toshio Hihara, both of Kanagawa, Japan

[73] Assignee: Mitsubishi Chemical Industries Limited, Japan

[21] Appl. No.: 414,733

[22] Filed: Sep. 3, 1982

[30] Foreign Application Priority Data

Sep. 16, 1981 [JP] Japan .................................. 56-145943  
Dec. 23, 1981 [JP] Japan .................................. 57-208498  
Feb. 9, 1982 [JP] Japan .................................. 57-19289

[51] Int. Cl.³ .................... C09B 62/06; C09B 62/085; C09B 62/09; D06P 1/382
[52] U.S. Cl. .................................. 534/635; 544/187; 544/218; 534/655; 534/756; 534/757; 534/766; 534/773
[58] Field of Search ............................ 260/153, 156

[56] References Cited

U.S. PATENT DOCUMENTS 4,017,477  4/1977  Hegar et al. ..................... 260/153  
4,067,864  1/1978  Obsterlein et al. ............... 260/153  
4,242,259  12/1980 Harms et al. ..................... 260/153  
4,299,764  11/1981 Jager ............................. 260/153

Primary Examiner—Floyd D. Higel  
Attorney, Agent, or Firm—Sughrue, Mion, Zinn, Macpeak, and Seas

[57] ABSTRACT

Diaminopyridine-based azo dyes for cellulose-containing fibers, represented by the following formula:

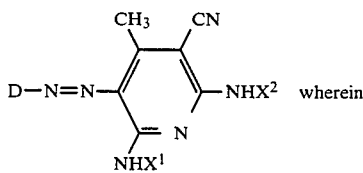

wherein

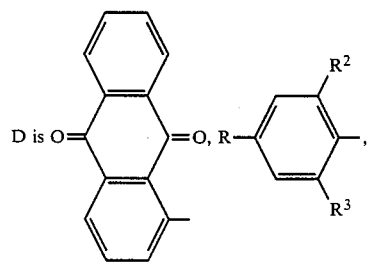

-continued

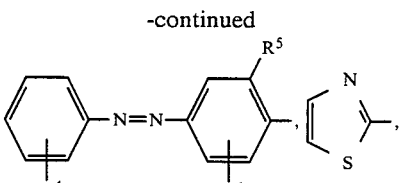

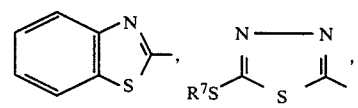

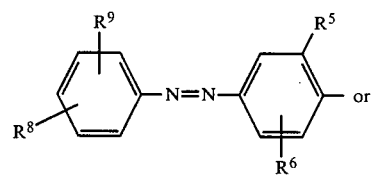

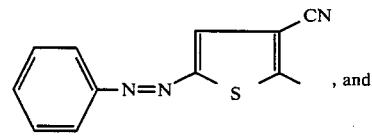

one of $X^1$ and $X^2$ is $-(A)_n-$ 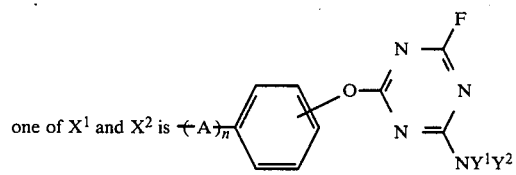

and the other is hydrogen, phenyl, benzyl, allyl, or alkyl which are unsubstituted or substituted by hydroxyl or lower alkoxy (wherein
A is methylene, ethylene, propylene, or 1,3-butylene; n is 0 or 1;
$Y^1$ and $Y^2$, which are the same or different, are hydrogen, alkyl, alkenyl, cyclohexyl, aryl, or aralkyl which are unsubstituted or substituted by cyano, hydroxy, lower alkoxy, or dialkylamino, or $Y^1$ and $Y^2$ together form a 5- or 6-membered heterocyclic ring ($NY^1Y^2$) containing one nitrogen, the total number of carbon atoms of $Y^1$ and $Y^2$ being 18 or less;
$R^1$ is nitro, cyano, methylsulfonyl, phenylsulfonyl, mono-lower alkylaminosulfonyl, di-lower alkylaminosulfonyl, acetyl, or benzoyl;
$R^2$ and $R^3$, which are the same or different, are hydrogen, trifluoromethyl, halogen, or cyano;
$R^4$ is hydrogen, lower alkyl, mono- or di-lower alkylaminosulfonyl, mono/or di-lower alkylcarbamoyl, or acetylamino;
$R^5$ and $R^6$, which are the same or different, are hydrogen, halogen, or lower alkyl;
$R^7$ is lower alkyl;
$R^8$ is trifluoromethyl, or halogen; and
$R^9$ is hydrogen, or halogen).

The dyes are useful for dyeing cellulose-containing fibers, particularly cellulose fibers and mixed fibers of polyester fibers and cellulose fibers in from orange to blue.

3 Claims, No Drawings

2,6-DIAMINOPYRIDINE-BASED AZO DYES FOR CELLULOSE-CONTAINING FIBERS

FIELD OF THE INVENTION

The present invention relates to diaminopyridine-based azo dyes for cellulose-containing fibers. More particularly, it relates to reactive azo dyes for use in dyeing of cellulose-containing fibers, particularly cellulose fibers and mixed fibers of polyester fibers and cellulose fibers in from orange to blue having excellent fastness to light, etc.

SUMMARY OF THE INVENTION

The present invention is to provide diaminopyridine-based azo dyes for cellulose-containing fibers, represented by the general formula (I):

[Structure (I)]

wherein

D is [anthraquinone structure] =O, $R^1$ [phenyl with $R^2$, $R^3$],

[phenyl-N=N-phenyl with $R^4$, $R^5$, $R^6$], [thiazole with N], [benzothiazole with N, S],

[thiadiazole with $R^7S$, S], [phenyl-N=N-phenyl with $R^8$, $R^9$, $R^5$, $R^6$] or

[phenyl-N=N-thiazole with CN]; and

[structure with one of $X^1$ and $X^2$ is $\mathrm{+A+_{\mathit{n}}}$-phenyl-O-triazine with F, N, $NY^1Y^2$], and the other is a hydrogen atom, a phenyl group, a benzyl group, an allyl group, or an alkyl group which may be substituted by a hydroxyl group or a lower alkoxy group
(wherein)

A is a methylene group, an ethylene group, a propylene group, or a 1,3-butylene group;

n is 0 or 1;

$Y^1$ and $Y^2$ are each a hydrogen atom, or an alkyl group, an alkenyl group, a cyclohexyl group, an aryl group, or an aralkyl group which may all be substituted by a cyano group, a hydroxy group, a lower alkoxy group, or a dialkylamino group, and they may combine together in combination with nitrogen to form a 5- or 6-membered nitrogen-containing heterocylic ring ($NY^1Y^2$), the total number of carbon atoms of $Y^1$ and $Y^2$ being 18 or less;

$R^1$ is a nitro group, a cyano group, a methylsulfonyl group, a phenylsulfonyl group, a mono-lower alkylaminosulfonyl group, a di-lower alkylaminosulfonyl group, an acetyl group, or a benzoyl group;

$R^2$ and $R^3$ are each a hydrogen atom, a trifluoromethyl group, a halogen atom, or a cyano group;

$R^4$ is a hydrogen atom, a lower alkyl group, a mono- or di-lower alkylaminosulfonyl group, a mono- or di-lower alkylcarbamoyl group, or an acetylamino group;

$R^5$ and $R^6$ are each a hydrogen atom, a halogen atom, or a lower alkyl group;

$R^7$ is a lower alkyl group;

$R^8$ is a trifluoromethyl group, or a halogen atom; and $R^9$ is a hydrogen atom, or a halogen atom).

DETAILED DESCRIPTION OF THE INVENTION

The dyes represented by the general formula (I) can be easily prepared, for example, by reacting compounds represented by the general formula (IV):

[Structure (IV)]

(wherein one of $Z^1$ and $Z^2$ is $\mathrm{+A+_{\mathit{n}}}$-phenyl-OH)

and the other is a hydrogen atom, a phenyl group, a benzyl group, an allyl group, or an alkyl group which may be substituted by a hydroxyl group or a lower alkoxy group, and A and n are the same as described hereinbefore) with compounds represented by the general formula (V):

[Structure (V) - triazine with F, F, $NY^1Y^2$]

(wherein $Y^1$ and $Y^2$ are the same as described hereinbefore) in a solvent, e.g., N-methyl-2-pyrrolidone.

Halogen atoms as indicated by $R^2$, $R^3$, $R^5$, $R^6$, $R^8$ and $R^9$ in the general formulae (I) and (IV) include a fluorine atom, a chlorine atom, and a bromine atom. Lower alkyl groups as indicated by $R^4$ and $R^5$ include a methyl group, an ethyl group, and a straight or branched alkyl group containing from 3 to 4 carbon atoms.

Alkyl groups as indicated by $X^1$, $X^2$, $Z^1$ and $Z^2$ include a methyl group, an ethyl group, and a straight alkyl group containing from 3 to 6 carbon atoms. Examples of alkyl groups substituted by a hydroxyl group include a 2-hydroxyethyl group, a 3-hydroxypropyl group, a 2-hydroxypropyl group, a 2-hydroxybutyl group, a 4-hydroxybutyl group, a 1,1-dimethyl-2-hydroxyethyl group, a 5-hydroxypentyl group, a 6-hydroxyhexyl group, a ($\beta$-hydroxy)ethoxyethyl group, a ($\gamma$-hydroxy)propoxypropyl group, and a ($\beta$-hydroxy)ethoxyethoxyethyl group. Examples of alkyl groups substituted by a lower alkoxy group include a 2-methoxyethyl group, a 2-ethoxyethyl group, a 3-methoxypropyl group, a 3-isopropoxypropyl group, a methoxyethoxyethyl group, an ethoxyethoxypropyl group, a methoxyisopropoxyethyl group, and a methoxyethoxyethyl group.

Alkyl groups as indicated by $Y^1$ and $Y^2$ in the general formulae (I) and (V) include a methyl group, an ethyl group, and a straight or branched alkyl group containing from 3 to 18 carbon atoms. Examples of substituted alkyl groups include cyano group-, hydroxyl group-, lower alkoxy group-, or dialkylamino group-substituted alkyl groups, such as a cyanomethyl group, a 2-cyanoethyl group, a 3-cyanopropyl group, a 2-hydroxyethyl group, a 2-hydroxypropyl group, a 3-hydroxypropyl group, a 4-hydroxybutyl group, a 2-(2-hydroxyethoxy)ethyl group, a tris(hydroxymethyl)methyl group, a 2-ethoxyethyl group, a 3-isopropoxypropyl group, a 3-(2-methoxyethoxy)propyl group, a 2,2-diethoxyethyl group, a 2-(N,N-diethylamino)ethyl group, a 2-(N,N-dimethylamino)ethyl group, and a 3-(N,N-dimethylamino)propyl group.

Alkenyl groups include an allyl group, a 2-methylallyl group, a 3-methylallyl group, and a straight or branched alkenyl group containing from 4 to 18 carbon atoms. Substituted alkenyl groups include cyano group-, hydroxy group-, or lower alkoxy group-substituted alkenyl groups, such as a 3-cyanoallyl group, a 2-hydroxyallyl group, a 3-methoxyethoxyallyl group, and a 1-methyl-3-(N,N-diethylamino)allyl group.

Aryl groups include a phenyl group, a naphthyl group, an o-tolyl group, and a p-butylphenyl group. Examples of aryl groups substituted by a cyano group, a hydroxy group, a lower alkoxy group, or a dialkylamino group include an m-cyanophenyl group, a p-hydroxyphenyl group, a p-methoxyphenyl group, a p-(2-methoxyethoxy)phenyl group, a 2,5-dimethoxyphenyl group, and a p-(N,N-dimethylamino)phenyl group.

Aralkyl groups include a benzyl group, a phenetyl group, an m-methylbenzyl group, and a p-methylphenetyl group. Examples of substituted aralkyl groups include an m-cyanobenzyl group, a p-hydroxybenzyl group, a p-hydroxyphenetyl group, and an o-anisyl group.

Nitrogen-containing heterocyclic groups as represented by $NY^1Y^2$ include a 1-pyrrolidinyl group, a 3-methyl-1-pyrrolidinyl group, a 2-hydroxyethyl-1-pyrrolidinyl group, a 2,5-dimethyl-1-pyrrolidinyl group, a 3-thiazolidinyl group, a 1-pyrrolyl group, a 1-pyrazolyl group, a 1-imidazolyl group, a morpholino group, a piperidino group, a 2,6-dimethylpiperidino group, a 1-piperadinyl group, and a 4-methyl-1-piperazinyl group.

Of the compounds represented by $NY^1Y^2$, di-substituted amino groups having a total number of carbon atoms of from 6 to 12 are particularly preferred.

When n is 0, in particular, light fastness is excellent.

In preparing the disazo dyes of the general formula (I), disazo compounds represented by the general formula (II) are added to from 1 to 1.2 moles of difluorotriazines represented by the general formula (III), per mole of the disazo compound, and they are heated at a temperature of from 40° to 90° C. for a period of from 0.5 to 5 hours in an organic solvent, such as acetone, methyl ethyl ketone, toluene, nitrobenzene, dioxane, N,N-dimethylformaldehyde, N-methyl-2-pyrrolidone, or dimethylsulfoxide, in the presence of from 1 to 2 moles per mole of the disazo compound of an acid coupler, such as tertiary amine, e.g., triethylamine, tributylamine, or N,N-diethylaniline, and inorganic base, e.g., potassium carbonate, or potassium hydrogencarbonate. The reaction solution is then cooled and poured into, for example, water to form a precipitate. By separating the precipitate by techniques such as filtration and centrifugal separation, there can be almost quantitatively obtained the disazo dyes represented by the general formula (I).

Cellulose-containing fibers which are to be dyed with the dyes represented by the general formula (I) include fibers such as natural fibers, e.g., cotton and flax, semisynthetic fibers, e.g., viscose rayon and copper ammonia rayon, and modified cellulose fibers, e.g., partially aminated or partially acylated cellulose fibers, and their fabrics, unwoven fabrics, and so forth. In addition, mixed fibers of cellulose fibers and other fibers, such as polyester fibers, cation dyeable polyester fibers, anion dyeable polyester fibers, polyamide fibers, wool, acryl fibers, urethane fibers, diacetate fibers, and triacetate fibers, and their fabrics can be used. Of the above-described fibers and fabrics, cellulose fibers, mixed fibers of cellulose fibers and polyester fibers, and their fabrics are particularly suitable for dyeing with the dyes of the general formula (I).

In the practice of dyeing, it is desirable that the dye of the general formula (I) is finely dispersed in a medium so that the grain size is from about 0.5 to 2 microns.

Various techniques can be employed for such fine dispersion, including a method in which a nonionic or Pluronic surface active agent, an anionic dispersant, such as sodium ligninsulfonate, or a water-soluble dispersant, such as a sodium salt of a naphthalene-sulfonic acid-formalin condensate, is employed, and the dye is finely dispersed in water by the use of a grinder such as a sand grinder and a mill; a method in which a water sparingly soluble or water-insoluble dispersant, such as a compound prepared by adding a low molecular amount of ethylene oxide to sulfosuccinic acid ester, nonylphenol, or the like, is employed, and the dye is finely dispersed in a solvent other than water, such as alcohols, e.g., ethyl alcohol, isopropyl alcohol, and polyethylene glycol, ketones, e.g., acetone and methyl ethyl ketone, hydrocarbons, e.g., n-hexane, toluene, xylene, and mineral turpentine, halogenated hydrocarbons, e.g., tetrachloroethylene, esters, e.g., ethyl acetate and butyl acetate, ethers, e.g., dioxane, and tetraethylene glycol dimethyl ether, and their mixed solvents, and a method in which the dye is finely dispersed in a mixture of water and a solvent compatible with water in any proportion, selected from the above-described solvents.

In addition, a polymeric compound soluble in each dispersant, a surface active agent having mainly a function other than the dispersion action, etc., may be added in the course of the fine dispersion.

The finely dispersed dye solution can be used as such as a padding bath for use in a padding dyeing method, or as a printing color paste for use in a printing method. It is usual, however, that the finely dispersed dye solution is diluted with water, a mixture of water and a solvent compatible with water in any proportion, an o/w emulsion in which the oil phase is petroleum hydrocarbon such as mineral turpentine or halogenated hydrocarbon such as tetrachloroethylene, or a w/o emulsion in which the oil phase is the same as above to a level determined depending on the desired dyeing concentration and, thereafter, is used as a padding bath or a printing color paste.

In the preparation of such padding baths and printing color pastes, a cellulose fiber-swelling agent can be added for advantageously effecting dyeing, or alkali metal compounds, organic epoxy compounds, organic vinyl compounds, etc., can be added as acid couplers for the purpose of accelerating the reaction between the dye and cellulose fibers. Alkali metal compounds which can be used include alkali metal carbonic acid salts, alkali metal hydrocarbonic acid salts, alkali metal phosphoric acid salts, alkali metal boric acid salts, alkali metal silicic acid salts, alkali metal hydroxides, alkali metal aliphatic acid salts, e.g., alkali metal acetic acid salts, and alkali metal precursors which generate alkalis when heated in the presence of water, such as sodium trichloroacetate and sodium acetoacetate. The amount of the alkali metal compound being used is usually sufficient to be such that the pH of the padding bath or printing color paste is from 7.5 to 8.5. Organic epoxy compounds which can be used include ethylene glycol diglycidyl ether and polyethylene glycol diglycidyl ether having an average molecular weight of from 150 to 400. Organic vinyl compounds include ethylene glycol diacrylate and diacrylate or dimethacrylate of polyethylene glycol having an average molecular weight of from 150 to 400. The amount of the organic epoxy compound or organic vinyl compound being used is from about 3 to 6% by weight based on the padding bath or printing color paste.

In order to prevent dry migration during padding dyeing, or to regulate the color paste viscosity to the optimum level in various printing methods, a tackifier such as a water-soluble polymer, e.g., sodium alginate, may be added.

The preparation of padding bath or printing color paste is not limited to the above-described methods. It is not always necessary for the cellulose swelling agent and acid coupler to be present in the padding bath or printing color paste, and they may be added in advance to cellulose fibers. Any cellulose fiber-swelling agents can be used as long as they have a boiling point of at least 150° C. and have the effect of swelling cellulose fibers. Examples are ureas, such as N,N,N',N'-tetramethylurea, polyhydric alcohols, such as polyethylene glycol and polypropylene glycol, and their derivatives. In particular, polyhydric alcohol derivatives which are prepared by dimethylating or diacetylating both terminal hydroxy groups of polyethylene glycol, polypropylene glycol, or the like having an average molecular weight of from about 200 to 500 and which do not react with the reactive groups of the dye are preferred as cellulose fiber swelling agents.

The amount of the cellulose fiber-swelling agent used is appropriately from 5 to 25% by weight, preferably from 8 to 15% by weight, based on the padding bath or printing color paste.

The above-described cellulose-containing fibers are dyed with the dyes represented by the general formula (I) by the usual method. For example, a cellulose-containing fiber material is impregnated or printed with a padding bath or printing color pastes as prepared by the above-described method, heat-treated with hot air or super heated steam maintained at 160° to 220° C. for 0.5 to 10 minutes, or treated in high pressure saturated steam maintained at 120° to 150° C. for 3 to 30 minutes and, thereafter, washed with heated water containing a surface active agent, an o/w or w/o emulsion cleaning bath in which the oil phase is halogenated hydrocarbon such as tetrachloroethylene, or by the usual dry cleaning method.

In accordance with the above-described method, there can be obtained a dyed product which is sharp and uniformly dyed in a color having good light fastness and moisture fastness.

The following examples are given to illustrate the invention in greater detail although the invention is not limited thereto. All parts are by weight.

EXAMPLE 1

A dye composition consisting of 15 parts of a disazo dye represented by the formula:

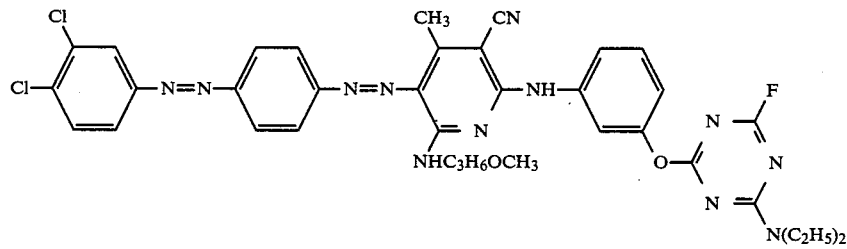

15 parts of a naphthalenesulfonic acid-formaldehyde condensate, and 70 parts of water was finely dispersed by the use of a paint shaker as a finely dispersing apparatus to prepare a dye dispersion. The thus-prepared dye dispersion was used to prepare a printing color paste having the following composition:

| | parts |
|---|---|
| Dye dispersion | 6.5 |
| 5% Aqueous sodium alginate solution | 55 |
| Polyethylene glycol dimethyl ethyl having an average molecular weight of 400 | 9 |

| | parts |
|---|---|
| Water | 29.5 |
| Total | 100 (pH: 8.0) |

A polyester/cotton mixed cloth (mixing ratio: 65/35) was printed with the above-prepared printing color paste by the use of a screen printing machine, which was then subjected to intermediate drying at 80° C. for 3 minutes and fixed by dry heating at 215° C. for 90 seconds. The cloth was washed with water and, thereafter, was subjected to soaping using a cleaning liquid containing 2 g/l of a nonionic surface active agent (Scorerol #900 (trade name) produced by Kao Sekken Co., Ltd.) at 80° C. for 20 minutes at a bath ratio of 1:30. There was thus obtained a product dyed in red having excellent light fastness and wet color fastness.

The dye used in this example was prepared as follows. 3',4'-Dichloro-4-aminoazobenzene was diazotized by the usual method and coupled with 2-(m-hydroxy)anilinio-3-cyano-4-methyl-6-(γ-methoxypropylamino)pyridine to obtain a dye. A mixture of 5.76 g of the above-obtained dye, 2.1 g of 2,4-difluoror-6-(diethyl)aminotriazine, 1.0 g of triethylamine, and 1.0 g of anhydrous potassium carbonate was added to 100 ml of acetone and heated at reflux for 3 hours to achieve a condensation reaction. The reaction solution was then added dropwise to 1,000 ml of water to form a precipitate. The precipitate was separated by filtration, washed with water, and dried at room temperature to obtain 7.1 g of red powder of the dye represented by the above-described formula (yield: 95%). For this dye, λmax (acetone) was 505 nm.

EXAMPLE 2

A dye composition consisting of 15 parts of a disazo dye represented by the formula:

10 parts of a Pluronic surface active agent (Pluronic L64 (trade name) produced by Asahi Denka Kogyo Co., Ltd.), and 75 parts of water was finely dispersed by the use of a sand grinder as a finely dispersing apparatus to prepare a dye dispersion. This dye dispersion was used to prepare a printing color paste having the following composition:

| | parts |
|---|---|
| Dye dispersion | 7 |
| 5% Aqueous sodium alginate solution | 55 |
| Diacetate of polypropylene glycol having an average molecular weight of 300 | 10 |
| Polyethylene glycol diglycidyl ether having an average molecular weight of 200 | 3 |
| Water | 25 |
| Total | 100 (pH: 6.5) |

A cotton broad (cotton yarn number: 40) which had been subjected to silket processing was printed with the above-prepared printing color paste by the use of a screen printing machine, was subjected to intermediate drying at 80° C. for 3 minutes, and then, was treated with super heated steam at 185° C. for 7 minutes. Thereafter, washing processing was performed in the same manner as in Example 1, and there was thus obtained a product dyed in red having excellent light fastness and wet color fastness.

The dye used in this example was prepared as follows. 2'-Trifluoromethyl-4'-chloro-4-aminoazobenzene was diazotized by the usual method and coupled with 2-(p-hydroxy)anilino-3-cyano-4-methyl-6-(β-hydroxyethylamino)pyridine to prepare a dye. The dye thus obtained was reacted with 2,4-difluoro-6-[di(n-propyl)amino]triazine in N-methyl-2-pyrrolidone by the use of triethylamine as an acid-removing agent to obtain the dye represented by the above-described formula. For this dye, λmax (acetone) was 506 nm.

EXAMPLE 3

A dye composition consisting of 10 parts of a disazo dye represented by the formula:

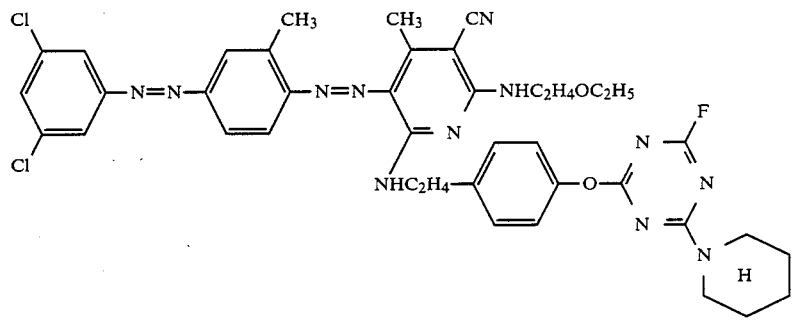

2 parts of polyoxyethylene glycol nonylphenyl ether (HLB: 8.9), and 88 parts of diethylene glycol diacetate was ground by the use of a paint conditioner as a finely dispersing apparatus to prepare a dye ink.

A mixture of 10 parts of the dye ink as prepared above and 55 parts of mineral turpentine was gradually poured into 35 parts of an aqueous solution having the composition as described hereinafter while stirring by a homomixer at 5,000 to 7,000 rpm, and the resulting mixture was then stirred until it became uniform to prepare a viscous o/w emulsion type color paste.

| Composition of Aqueous Solution | |
| --- | --- |
| | parts |
| Water | 31 |
| Repitol G (trade name, special nonionic surface active agent, produced by Dai-ichi Kogyo Seiyaku Co., Ltd.) | 3.8 |
| Sodium trichloroacetate | 0.1 |
| Total | 34.9 |

Using the above-prepared color paste, a polyester/cotton mixed cloth (mixing ratio: 65/35) was printed by the use of a screen printing machine, which was then dried at 100° C. for 2 minutes and treated with super heated steam at 175° C. for 7 minutes. Thereafter, when the cloth was washed with a hot tetrachloroethylene bath containing a small amount of water and dried, there was obtained a product dyed in red having excellent light fastness and wet color fastness and free from contamination in the white background.

The dye used in this example was prepared as follows. 3',5'-Dichloro-3-methyl-4-aminoazobenzene was diazotized by the usual method and coupled with 2-ethoxyethylamino-3-cyano-4-methyl-6-(p-hydroxyphenylethylamino)pyridine to prepare a dye. The dye thus prepared was then reacted with 2,4-difluoro-6-piperidinotriazine in the same manner as in Example 1 to obtain the desired dye. For this dye, λmax (acetone) was 506 nm.

EXAMPLE 4

A dye composition consisting of 16 parts of a disazo dye represented by the formula:

7 parts of polyoxyethylene glycol nonylphenyl ether (HLB: 13.3), 3 parts of a naphthalenesulfonic acid-formaldehyde condensate, and 74 parts of water was finely dispersed by the use of a sand grinder to prepare a dye dispersion. This dye dispersion was used to prepare a padding bath having the following composition:

| | parts |
| --- | --- |
| Dye dispersion | 6 |
| Tetraethylene glycol dimethyl ether | 15 |
| Water | 79 |
| Total | 100 (pH: 8.0) |

A polyester/cotton mixed cloth (mixing ratio: 65/35) was impregnated with the above-prepared padding bath, squeezed at a squeezing ratio of 45%, dried at 100° C. for 2 minutes, and fixed by dry heating at 200° C. for 1 minute. By washing the cloth with a hot ethanol bath, there was obtained a product dyed in red having excellent light fastness and wet color fastness.

The dye used in this example was prepared in the same manner as in Example 1. For this dye, λmax (acetone) was 506 nm.

EXAMPLE 5

Printing was performed in the same manner as in Example 1 except that a nylon/rayon mixed cloth (mixing ratio: 50/50) was used, and the dry heating fixing temperature was 185° C. There was obtained a product dyed in red having good wet color fastness and light fastness.

EXAMPLE 6

Using a series of disazo dyes as shown in Tables 1 to 15, printing was performed in the same manner as in Example 1. All dyed products had good light fastness and wet color fastness. The hue of each dyed cloth and λmax (acetone) of dye are shown in Tables 1 to 15.

TABLE 1

Structure:
A—N=N—B—N=N—[pyridine ring with CH₃, CN, NHX, N, and NH—phenyl—O—triazine(F, Z)]

| No. | A | B | —X | —Z | Hue of Dyed Cloth | λmax (acetone) (nm) |
|-----|---|---|----|----|-------------------|---------------------|
| 1 | 2,4-diCl-phenyl | 4-phenyl | —H | —N(C₃H₆CN)₂ | red | 505 |
| 2 | 2-Cl, 4-Br-phenyl | " | —CH₂CH₂OCH₂CH₃ | —N(CH₃)(3-CH₃-phenyl) | " | 504 |
| 3 | 2,4-diF-phenyl | " | " | —N[C₃H₇(n)]₂ | " | 505 |
| 4 | 2,4-diCl-phenyl | " | " | 2,6-dimethylpiperidin-1-yl (—N with CH₃, H, CH₃) | " | " |
| 5 | " | 2-C₂H₅-phenyl | —C₂H₄OC₂H₄OC₂H₅ | —N(CH₂—CH=CH₂)₂ | " | 506 |
| 6 | " | 2-Cl-phenyl | " | —NH₂ | deep red | 510 |
| 7 | 3-Cl-phenyl | 2,4-diCH₃-phenyl | " | —NH(C₂H₄CN) | red | 506 |
| 8 | 2-Cl, 4-CF₃-phenyl | 4-phenyl | —CH₂CH(OH)CH₂CH₃ | —N(pyrrolidinyl)H | " | 505 |
| 9 | " | 2,4-diCH₃-phenyl | " | —N(CH₂CH₂OH)₂ | " | 508 |
| 10 | 2,4-diBr-phenyl | 4-phenyl | " | —NHC₂H₄—(4-CH₃-phenyl) | " | 504 |

TABLE 1-continued

Structure: A—N=N—B—N=N—[pyridine with CH₃, CN, NHX, N, NH—phenyl—O—triazine(F, Z)]

| No. | Ⓐ— | Ⓑ— | —X | —Z | Hue of Dyed Cloth | λmax (acetone) (nm) |
|---|---|---|---|---|---|---|
| 11 | " | " | —CH₂CHOH(CH₃) | —N[C₅H₁₁(n)]₂ | " | " |
| 12 | " | 2-C₃H₇(n)-phenyl | " | —NH—C₆H₄—C₂H₅ | " | 506 |
| 13 | 2,4,5-Cl₃-phenyl | 4-phenyl | —CH₂CH₂CH₂OCH₃ | —N(H)(C₁₄H₂₉(sec)) | deep red | 510 |
| 14 | " | " | " | —N(C₂H₄OH)(C₂H₄CN) | " | " |
| 15 | " | 2-C₄H₉(n)-5-methyl-phenyl | —C₃H₇(i) | —N[C₃H₆N(CH₃)₂]₂ | " | 512 |
| 16 | 2,4,6-Cl₃-phenyl | 4-phenyl | " | —N[C₉H₁₉(n)]₂ | " | 510 |
| 17 | " | " | " | —NHC₇H₁₅(n) | " | " |
| 18 | " | 3-Br-6-methyl-phenyl | —CH₂CH₂CH₂OH | —N(morpholino) | " | 513 |

TABLE 2

Structure: A—N=N—B—N=N—[pyridine with CH₃, CN, NHX, N, NH—p-phenyl—O—triazine(F, Z)]

| No. | Ⓐ— | Ⓑ— | —X | —Z | Hue of Dyed Cloth | λmax (acetone) (nm) |
|---|---|---|---|---|---|---|
| 19 | 2,4-Cl₂-phenyl | 4-phenyl | —C₄H₉(i) | —N(pyrrolyl) | red | 506 |

TABLE 2-continued

Structure: A—N=N—B—N=N—[pyridine ring with CH3, CN, NHX substituents]—NH—[phenyl]—O—[triazine with F and Z]

| No. | A | B | —X | —Z | Hue of Dyed Cloth | λmax (acetone) (nm) |
|---|---|---|---|---|---|---|
| 20 | 2-Br, 4-CF3-phenyl | " | —CH3 | piperidin-1-yl (—NH in ring) | " | " |
| 21 | " | 3-Cl-phenyl | —C2H4OCH3 | —NH—(2,5-dimethoxyphenyl) | deep red | 510 |
| 22 | 2-CF3, 4-Cl-phenyl | 4-phenyl | " | —N(CH2CH2CH2OH)(CH2—C6H5) | red | 506 |
| 23 | 3,4-dichlorophenyl | " | " | —NH—(3-cyanophenyl) | " | " |
| 24 | 2,4-difluorophenyl | 2-C4H9(n)-phenyl | phenyl | —NH2 | " | 508 |
| 25 | " | 4-methylphenyl | —CH2—CH=CH2 | —N[C3H7(i)]2 | " | 506 |
| 26 | 2,4-dibromo-6-chloro-phenyl | " | —C2H4OCH3 | —NHC3H7(i) | deep red | 509 |
| 27 | 2-CF3, 4-Br-phenyl | " | " | —N(C2H4CN)2 | red | 506 |
| 28 | 3,4-dichlorophenyl | " | —H | —N(CH2—CH=CH2)2 | " | " |
| 29 | " | 2,4,6-triethylphenyl | —CH2CH2OCH3 | —N(C2H5)(C2H4N(C2H5)2) | deep red | 509 |
| 30 | " | 2-methyl-4-C3H7(i)-phenyl | —CH2—C6H5 | —N[C3H7(i)]2 | " | 508 |

TABLE 2-continued

| No. | A- | B- | —X | —Z | Hue of Dyed Cloth | λmax (acetone) (nm) |
|---|---|---|---|---|---|---|
| 31 | 2-CF₃, 4-F, methyl phenyl | 4-methylphenyl | —C₅H₁₁(n) | —NHC₂H₄—(3-CH₃-phenyl) | red | 506 |
| 32 | " | " | " | —N(C₂H₅)₂ | " | " |
| 33 | " | 3,4-Br₂-phenyl | —CH₂CH₂OCH₂CH₂OH | —N(C₂H₄CN)₂ | red-brown | 512 |
| 34 | 2,4,5-Cl₃-phenyl | 4-methylphenyl | " | —N[C₆H₁₃(sec)]₂ | deep red | 509 |
| 35 | " | 2,4-dimethylphenyl | —CH₂CH₂CH₂OC₂H₅ | —N(C₂H₄OH)₂ | " | 510 |
| 36 | " | 2-C₂H₅-4-CH₃-phenyl | —C₃H₇(n) | —N(C₂H₅)₂ | " | " |

TABLE 3

| No. | A- | B- | —X | —Z | Hue of Dyed Cloth | λmax (acetone) (nm) |
|---|---|---|---|---|---|---|
| 37 | 2-CF₃-4-Cl-phenyl | 4-methylphenyl | —(CH₂)₃O(C₂H₄O)₂CH₃ | —N(piperazinyl)—C₂H₄CN | red | 505 |
| 38 | 2,4-Cl₂-phenyl | 2-C₃H₇(i)-4-methylphenyl | —C₄H₉(i) | —NHCH₃ | " | 507 |
| 39 | 3,4-Cl₂-phenyl | 2,4-Cl₂-phenyl | —CH₂—C₆H₅ | —N(H)(C₂H₄CN) | deep red | 511 |

TABLE 3-continued

Structure: A—N=N—B—N=N—[pyridine ring with CH₃, CN, NHX, and NH-phenyl-O-C(=N-CF)(N=CZ) triazine substituents]

| No. | —Ⓐ— | —Ⓑ— | —X | —Z | Hue of Dyed Cloth | λmax (acetone) (nm) |
|---|---|---|---|---|---|---|
| 40 | 2,4-difluorophenyl | 1,4-phenylene | phenyl | —N[C₃H₇(n)]₂ | red | 505 |
| 41 | 2,4-dibromophenyl | " | —C₃H₆OCH₃ | —NH(CH₂)₈CH=CH(CH₂)₇CH₃ | " | 504 |

TABLE 4

Structure: A—N=N—B—N=N—[pyridine ring with CH₃, CN, NHX, and NHCH₂-phenyl-O-C(=N-CF)(N=CZ) triazine substituents]

| No. | —Ⓐ— | —Ⓑ— | —X | —Z | Hue of Dyed Cloth | λmax (acetone) (nm) |
|---|---|---|---|---|---|---|
| 42 | 3,4-dichlorophenyl | 1,4-phenylene | —C₂H₄OC₂H₅ | —N[C₉H₁₉(n)]₂ | red | 506 |
| 43 | 2,4-dichlorophenyl | " | " | —N(CH=CH)₂S (thiomorpholino) | " | " |
| 44 | 2-bromo-4-chlorophenyl | 2-bromo-1,4-phenylene | " | —N[C₃H₇(i)]₂ | deep red | 510 |
| 45 | 2-chloro-4-trifluoromethylphenyl | 1,4-phenylene | " | —N[C₄H₉(n)]₂ | red | 507 |
| 46 | 2-chloro-5-trifluoromethylphenyl | 1,4-phenylene | —C₆H₁₃(n) | —N[C₄H₉(sec)]₂ | red | 506 |
| 47 | 2,4,5-trichlorophenyl | 2-iso-butyl-1,4-phenylene | —(CH₂)₃O(CH₂)₂OH | —N(C₂H₄OCH₃)(CH₂—CH=CH₂) | deep red | 512 |

TABLE 5

Structure: A—N=N—B—N=N—[pyridine with CH₃, CN, NHX, and NHC₂H₄—C₆H₄—O—triazine(F, Z)]

| No. | A— | B— | —X | —Z | Hue of Dyed Cloth | λmax (acetone) (nm) |
|---|---|---|---|---|---|---|
| 48 | 2,4-difluorophenyl | 4-phenyl | —CH₂CHCH₂CH₃ (OH) | —NH—CH₂—C(CH₃)=CH—OH | red | 506 |
| 49 | 3,4-dichlorophenyl | 2,5-dimethylphenyl | " | —NHC₂H₄—C₆H₅ | deep red | 510 |
| 50 | 2,3,4-trichlorophenyl | 4-phenyl | —CH₂CH₂OC₃H₇(i) | —N(C₂H₄OH)(C₂H₄CN) | " | 511 |
| 51 | 2,6-dibromophenyl | " | " | —NH—cyclohexyl | red | 505 |

TABLE 6

Structure: A—N=N—B—N=N—[pyridine with CH₃, CN, NHX, and NHCH(CH₃)CH₂—C₆H₄—O—triazine(F, Z)]

| No. | A— | B— | —X | —Z | Hue of Dyed Cloth | λmax (acetone) (nm) |
|---|---|---|---|---|---|---|
| 52 | 2-CF₃-4-Cl-phenyl | 4-phenyl | —(CH₂)₅OH | —NHC₃H₆OH | red | 506 |
| 53 | 2,4-difluorophenyl | " | " | —N(C₂H₄OC₂H₅)₂ | " | " |
| 54 | 3,4,5-trichlorophenyl | " | " | morpholino (—N  O) | deep red | 511 |
| 55 | 3,5-dibromophenyl | 3-ethyl-4-methylphenyl | —C₄H₉(sec) | 4-methylpiperazino (—N  N—CH₃) | red | 506 |

TABLE 7

Structure: A—N=N—B—N=N—[pyridine with CH3, CN, NHX, NH—CH(CH3)CH2CH2—C6H4—O—triazine(F, Z)]

| No. | —A— | —B— | —X | —Z | Hue of Dyed Cloth | λmax (acetone) (nm) |
|---|---|---|---|---|---|---|
| 56 | 2-Br-4-CF3-phenyl | 4-phenyl | —CH2—C6H5 | piperidino (—N(CH2)5 with H) | red | 506 |
| 57 | 2,5-di-Br-phenyl | 2-Cl-4-phenyl | —CH2—CH=CH2 | —N(C2H4OCH3)(C2H4CN) | deep red | 511 |
| 58 | 2,4,6-tri-Br-phenyl | 4-phenyl | —C3H6OCH3 | —N(C2H4OH)(CH2C6H5) | " | 509 |
| 59 | 3,5-di-Cl-phenyl | " | " | —N(C2H4CN)2 | red | 504 |

TABLE 8

Structure: A—N=N—B—N=N—[pyridine with CH3, CN, NHX, NH—C6H4—O—triazine(F, Z)]

| No. | —A— | —B— | —X | —Z | Hue of Dyed Cloth | λmax (acetone) (nm) |
|---|---|---|---|---|---|---|
| 60 | 2-Br-4-F-phenyl | 4-phenyl | —C6H5 | —N(C2H5)2 | red | 505 |
| 61 | 2,3-di-Cl-cyclohexenyl | " | —CH3 | —NHC6H13(sec) | " | " |
| 62 | 2-Br-4-CF3-phenyl | 2,4,6-tri-CH3-phenyl | " | —N[C3H7(n)]2 | deep red | 507 |

TABLE 8-continued
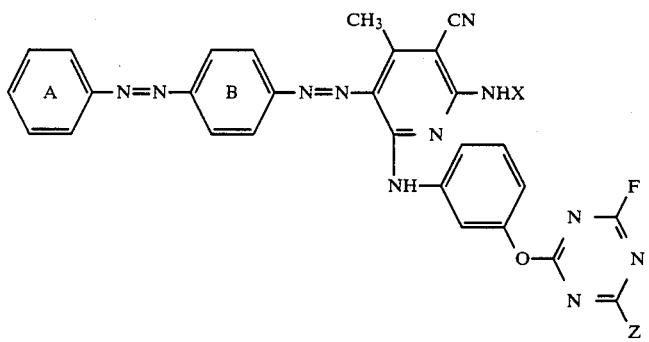
| No. | A | B | —X | —Z | Hue of Dyed Cloth | λmax (acetone) (nm) |
|---|---|---|---|---|---|---|
| 63 | 2-CF₃, 4-Br-phenyl | 4-methylphenyl | —C₃H₇(i) | —N(C₂H₄OCH₃)₂ | red | 507 |
| 64 | 3,4,5-Cl₃-phenyl | " | —C₂H₄OH | —N(H)(C₂H₅) | deep red | 511 |
TABLE 8
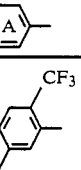
| No. | A | B | —X | —Z | Hue of Dyed Cloth | λmax (acetone) (nm) |
|---|---|---|---|---|---|---|
| 65 | 2-Cl, 4-Br-phenyl | 2-C₃H₇(i)-phenyl | —C₃H₆OCH₃ | —NHC₃H₆OH | red | 507 |
| 66 | 2-CF₃, 4-Br-phenyl | 2,4-Br₂-phenyl | " | —N[C₃H₇(i)]₂ | red-brown | 514 |
| 67 | 2-Cl, 4-CF₃-phenyl | 2-CH₃, 4-Cl-phenyl | " | —NHC₂H₄OH | deep red | 511 |

TABLE 8-continued

[Structure: A-phenyl-N=N-B-phenyl-N=N-pyridine ring with CH3, CN, NHX substituents, N in ring, NH-phenyl-O-C(=N-triazine with F and Z)]

| No. | ⟨A⟩— | —⟨B⟩— | —X | —Z | Hue of Dyed Cloth | λmax (acetone) (nm) |
|-----|------|-------|-----|-----|-------------------|---------------------|
| 68 | CF₃, Br-phenyl | phenyl (para) | —C₃H₆OCH₃ | —N(C₂H₅)₂ | red | 506 |
| 69 | Cl, Cl, Cl-phenyl (2,4,5-trichloro) | " | —CH₃— | —N(CH₃)(cyclohexyl-H) | deep red | 511 |

TABLE 10

[Structure: similar to above with ortho-substituted NH-phenyl-O linkage]

| No. | ⟨A⟩— | —⟨B⟩— | —X | —Z | Hue of Dyed Cloth | λmax (acetone) (nm) |
|-----|------|-------|-----|-----|-------------------|---------------------|
| 70 | 2,4-dichlorophenyl | 2,4-dichloro-3-methylphenyl | —C₂H₄OH | —N[C₇H₁₅(n)]₂ | deep red | 513 |
| 71 | 3,4-dichlorophenyl | phenyl | —(CH₂)₆OH | —N(C₂H₅)(C₂H₄OH) | red | 505 |
| 72 | 2,4-difluorophenyl | " | " | —NH—phenyl | " | " |

TABLE 10-continued

[Structure: A-N=N-B-N=N-(pyridine ring with CH3, CN, NHX, N, NH-phenyl-O-C(=N)-triazine with F and Z)]

| No. | (A)- | (B)- | —X | —Z | Hue of Dyed Cloth | λmax (acetone) (nm) |
|---|---|---|---|---|---|---|
| 73 | 2,5-Br,Br-phenyl | " | —(CH2)2OH | —N(CH3)(CH2—CH=CH2) | " | 503 |
| 74 | 3-F,4-CF3-phenyl | " | —C6H13(n) | —N(C2H4OCH3)2 | " | 506 |

TABLE 11

[Structure: A-N=N-B-N=N-(pyridine ring with CH3, CN, NHX, N, NHCH2-phenyl-O-C(=N)-triazine with F and Z)]

| No. | (A)- | (B)- | —X | —Z | Hue of Dyed Cloth | λmax (acetone) (nm) |
|---|---|---|---|---|---|---|
| 75 | 2,5-Cl,Cl-phenyl | phenyl | —(CH2)3OH | —N(piperazinyl with H)N—C2H4OH | red | 505 |
| 76 | " | 2,4,6-tri-CH3-phenyl | —C2H4OC2H4OH | —N(C3H6CN)2 | deep red | 509 |
| 77 | 2,4-F,F-phenyl | phenyl | phenyl | —N(C2H4OC2H4OCH3)2 | red | 504 |
| 78 | 2-Cl,4-CF3-phenyl | 2,5-di-CH3-phenyl | —H | 2-methylpyrrolidinyl-NH | " | 506 |

TABLE 11-continued

Structure:

A—N=N—B—N=N—[pyridine ring with CH₃, CN, NHX, and =N—NHCH₂—C₆H₄—O—triazine(F, Z)]

| No. | (A)— | (B)— | —X | —Z | Hue of Dyed Cloth | λmax (acetone) (nm) |
|---|---|---|---|---|---|---|
| 79 | 2,6-dibromophenyl (Br, Br) | 4-methylphenyl | —C₃H₇(i) | —N(CH₃)₂ | " | 504 |

TABLE 12

Structure:

A—N=N—B—N=N—[pyridine ring with CH₃, CN, NHX, and =N—NHC₂H₄—C₆H₄—O—triazine(F, Z)]

| No. | (A)— | (B)— | —X | —Z | Hue of Dyed Cloth | λmax (acetone) (nm) |
|---|---|---|---|---|---|---|
| 80 | 2-CF₃, 5-F phenyl | 2-C₂H₅, 4-methylphenyl | —CH₂—CH=CH₂ | —N(morpholino) H O | red | 507 |
| 81 | " | 4-methylphenyl | —(CH₂)₄OH | —NHC₇H₁₅(n) | " | 505 |
| 82 | 2-Cl, 4-CF₃ phenyl | " | —C₃H₆OC₃H₇(i) | —NHC₃H₇(i) | " | " |
| 83 | 2,4,5-trichlorophenyl | 2-CH₃, 4-methylphenyl | —C₄H₉(i) | —N[C₄H₉(i)]₂ | deep red | 513 |

TABLE 13

Structure: A—N=N—B—N=N—[pyridine ring with CH3, CN, NHX, and NHCH(CH3)CH2— linked to phenyl-O-triazine with F and Z substituents]

| No. | A— | B— | —X | —Z | Hue of Dyed Cloth | λmax (acetone) (nm) |
|---|---|---|---|---|---|---|
| 84 | 2,3,4-trichlorophenyl | phenyl | —(CH₂)₅OH | —NHCH₃ | deep red | 511 |
| 85 | 3,4-dichlorophenyl | 2-bromo-5-methylphenyl | —C₃H₆OC₂H₄OCH₃ | —N[C₄H₉(n)]₂ | " | 509 |
| 86 | 2,4-dibromophenyl | 2-ethyl-5-methylphenyl | " | —N(pyrrolyl) | red | 507 |
| 87 | 3-CF₃-4-Cl-phenyl | phenyl | —H | —NH₂ | " | 506 |

TABLE 14

Structure: A—N=N—B—N=N—[pyridine ring with CH3, CN, NHX, and NHCH(CH3)CH2CH2— linked to phenyl-O-triazine with F and Z substituents]

| No. | A— | B— | —X | —Z | Hue of Dyed Cloth | λmax (acetone) (nm) |
|---|---|---|---|---|---|---|
| 88 | 3,4-dichlorophenyl | phenyl | —CH₂—C₆H₅ | —N[C₃H₇(n)]₂ | red | 505 |
| 89 | 2,4-dichlorophenyl | 2-ethyl-4-fluorophenyl | —C₂H₄OC₂H₅ | —N(piperazinyl)N—C₃H₆OH | deep red | 511 |
| 90 | 4-bromo-2-CF₃-phenyl | phenyl | —C₃H₆OH(n) | —N(C₂H₅)₂ | red | 505 |

TABLE 15
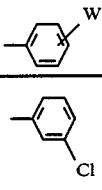
| No. | D— | m | —Z | 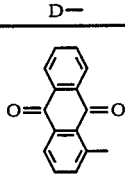 W | Hue of Dye Cloth (T/C mixed cloth) | λmax (acetone) (nm) |
|---|---|---|---|---|---|---|
| 91 | 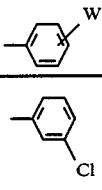 | 2 | —OC$_2$H$_4$OC$_2$H$_5$ | 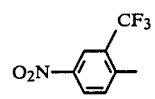 | red-brown | 483 |
| 92 | 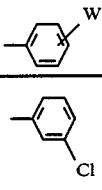 | " | —OCH$_3$ | 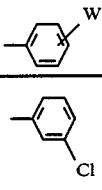 | red | 485 |
| 93 | " | 3 | —OC$_2$H$_5$ | 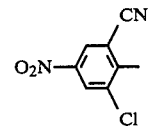 | " | 487 |
| 94 | 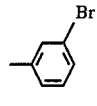 | 2 | —O—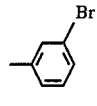 | 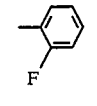 | bluish red | 512 |
| 95 | " | " | —OCH$_3$ | 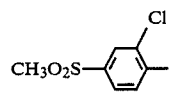 | " | " |
| 96 |  | " | —OC$_3$H$_7$(n) | 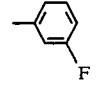 | orange | 470 |
| 97 | " | 3 | " | 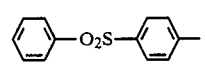 | " | 472 |
| 98 | 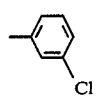 | 2 | —OC$_2$H$_4$OCH$_3$ | 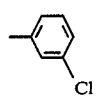 | gold | 469 |
| 99 | 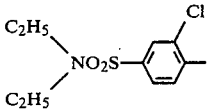 | " | —OC$_3$H$_6$OC$_2$H$_5$ | " | " | 461 |
| 100 |  | " | —OC$_2$H$_5$ | 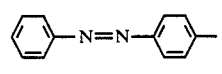 | yellowish red | 489 |
| 101 | " | 3 | —OC$_4$H$_9$(t) | 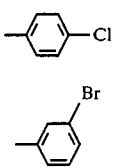 | " | " |

TABLE 15-continued
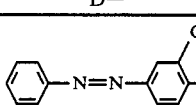
| No. | D— | m | —Z | 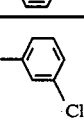 W | Hue of Dye Cloth (T/C mixed cloth) | λmax (acetone) (nm) |
|---|---|---|---|---|---|---|
| 102 | 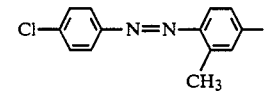 | 2 | —OCH$_3$ |  | " | 499 |
| 103 | 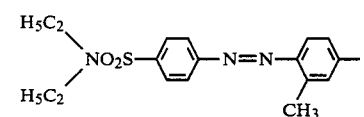 | " | " |  | red | 501 |
| 104 |  | " | —OC$_2$H$_5$ |  | " | 503 |
| 105 | " | 3 | 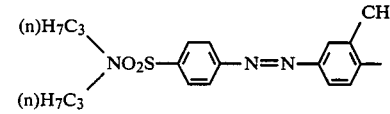 | " | " | 505 |
| 106 | " | 2 | —OCH$_3$ |  | " | 501 |
| 107 |  | " | —OC$_3$H$_7$(n) | 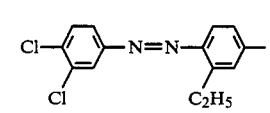 | " | 503 |
| 108 | " | " | —OC$_2$H$_4$OCH$_3$ |  | " | 501 |
| 109 | 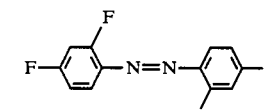 | " | —OCH$_3$ |  | deep red | 505 |
| 110 |  | " | 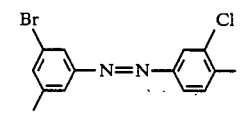 | " | " | " |
| 111 | " | " | —OC$_4$H$_9$(sec) |  | " | 503 |
| 112 |  | " | —OC$_3$H$_7$(i) |  | " | 507 |

TABLE 15-continued
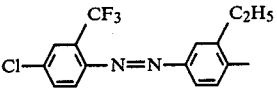
| No. | D— | m | —Z | [W-phenyl] | Hue of Dye Cloth (T/C mixed cloth) | λmax (acetone) (nm) |
|---|---|---|---|---|---|---|
| 113 | " | 3 | —OCH₃ | " | " | 508 |
| 114 |  | 2 | —OC₂H₅ | " | " | 505 |
| 115 | " | 3 | —OC₂H₄OCH₃ | Br | " | 506 |
| 116 | 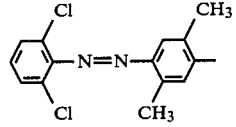 | 2 | —OC₅H₁₁(n) | Cl | " | 507 |
| 117 |  | " | —OC₄H₉(t) | (phenyl) | " | " |
| 118 | " | " | —O—(phenyl) | " | " | " |
| 119 | " | 3 | —OC₂H₄OC₂H₅ | Cl | " | 508 |
| 120 | 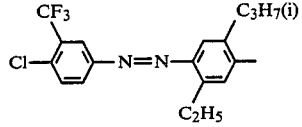 | 2 | —OC₃H₆OCH₃ | (phenyl) | " | 506 |
| 121 |  | 3 | —OCH₃ | F | " | 509 |
| 122 |  | 2 | —OC₂H₅ | Cl | orange | 468 |
| 123 |  | " | —OC₃H₇ | Cl (para) | " | " |
| 124 | 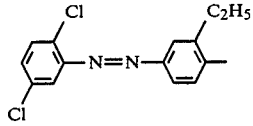 | " | —OC₂H₅ | (phenyl) | red | 494 |

TABLE 15-continued

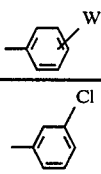

| No. | D— | m | —Z |  W | Hue of Dye Cloth (T/C mixed cloth) | λmax (acetone) (nm) |
|---|---|---|---|---|---|---|
| 125 | " | " | " | Cl (3-position) | " | 492 |
| 126 | 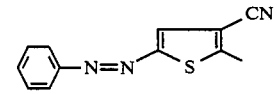 | " | —OC$_5$H$_{11}$(sec) | (unsubstituted) | reddish blue | 594 |
| 127 | " | 3 | —OC$_2$H$_5$ | " | " | 595 |
| 128 | " | 2 | —OC$_3$H$_7$(i) | Cl (3-position) | " | 592 |
| 129 | " | 3 | —OC$_4$H$_9$(sec) | Cl (2-position) | " | 593 |

EXAMPLE 7

A dye composition consisting of 15 parts of a disazo dye represented by the formula:

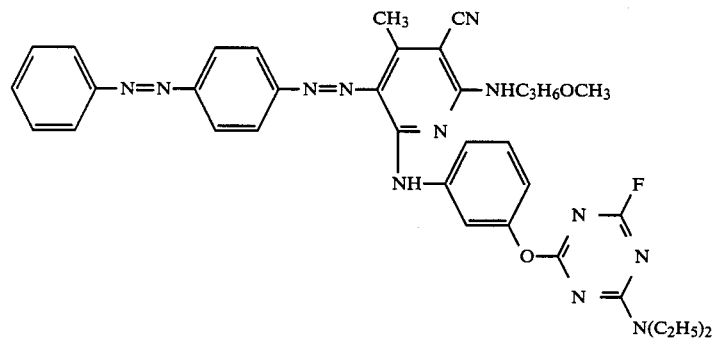

15 parts of a naphthalenesulfonic acid-formaldehyde condensate, and 70 parts of water was finely dispersed by the use of a paint shaker as a finely dispersing apparatus to prepare a dye dispersion. This dye dispersion was used to prepare a printing color paste having the following composition:

| | parts |
|---|---|
| Dye dispersion | 6.5 |
| 5% Aqueous sodium alginate solution | 55 |
| Polyethylene glycol dimethyl ether having an average molecular weight | 9 |

-continued

| | parts |
|---|---|
| of 400 | |
| Water | 29.5 |
| Total | 100 (pH 8.0) |

The thus-prepared printing color paste was printed on a polyester/cotton mixed cloth (mixing ratio: 65/35) by the use of a screen printer, was subjected to intermediate drying at 80° C. for 3 minutes, and was fixed by dry heating at 215° C. for 90 seconds. The cloth was then washed with water and was subjected to soaping using a cleaning liquid containing 2 g/l of a nonionic surface active agent (Scorerol #900 (trade name), produced by Kao Sekken Co., Ltd.) at 80° C. for 20 minutes at a bath ratio of 1:30. There was thus obtained a product dyed in yellowish red having excellent light fastness and wet color fastness.

The dye used in this example was prepared as follows.

In accordance with the usual method, 4-aminoazobenzene was diazotized and coupled with 2(m-hydroxy)anilino-3-cyano-4-methyl-6-(Y-methoxypropylamino)pyridine to prepare a dye. A mixture of 5.07 g of the above-prepared dye, 2.1 g of 2,4-difluoro-6-(diethyl)aminotriazine, and 1.0 g of anhydrous potassium carbonate was added to 100 ml of acetone and heated at reflux to achieve a condensation reaction. The resulting reaction solution was added dropwise to 1,000 ml of water. The precipitate thus obtained was separated by filtration, washed with water, and dried at room temperature to obtain 6.5 g of red powder of the dye represented by the above-described formula. For this dye, λmax (acetone was 490 nm.

EXAMPLE 8

A dye composition consisting of 15 parts of a disazo dye represented by the formula:

been subjected to silket processing, by the use of a screen printing machine, was subjected to intermediate drying at 80° C. for 3 minutes, and was treated with super heated steam at 185° C. for 7 minutes. Thereafter, a cleaning processing was performed in the same manner as in Example 7, and there was thus obtained a product dyed in reddish brown having excellent light fastness and wet color fastness.

The dye used in this example was prepared as follows.

In accordance with the usual method, 1-aminoanthraquinone was diazotized and coupled with 2-(p-hydroxy)anilino-3-cyano-4-methyl-6-(β-hydroxyethylamino)pyridine to prepare a dye. The dye thus formed was then reacted with 2,4-difluoro-6-[di(n-propyl)amino]triazine in N-methyl-2-pyrrolidone by the use of triethylamine as an acid-removing agent to obtain the desired dye. For this dye, λmax (acetone) was 483 nm.

EXAMPLE 9

A dye composition consisting of 10 parts of a monoazo dye represented by the formula:

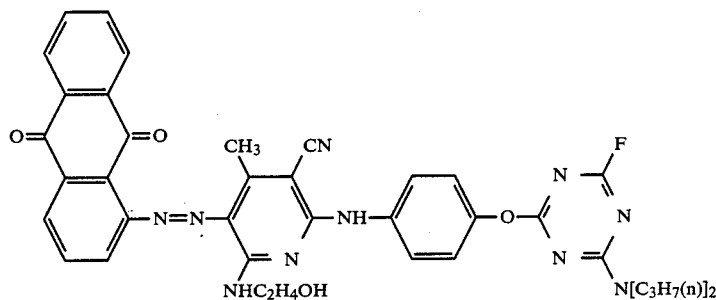

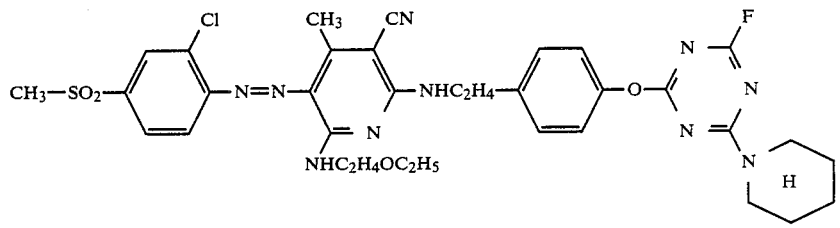

10 parts of a Pluronic surface active agent, Pluronic L64 (trade name, produced by Asahi Denka Kogyo Co., Ltd.), and 7.5 parts of water was finely dispersed by the use of a sand grinder as a finely dispersing apparatus to prepare a dye. This dye was used to prepare a printing color paste having the following composition:

| | parts |
|---|---|
| Dye dispersion | 7 |
| 5% Aqueous sodium alginate solution | 55 |
| Diacetate of polypropylene glycol having an average molecular weight of 300 | 10 |
| Polyethylene glycol diglycidyl ether having an average molecular weight of 200 | 3 |
| Water | 25 |
| Total | 100 (pH: 6.5) |

The above-prepared printing color paste was printed on a cotton broad (cotton yarn number: 40) which had 2 parts of polyoxyethylene glycol nonylphenyl ether (HLB: 8.9), and 88 parts of diethylene glycol diacetate was finely dispersed by the use of a paint conditioner as a finely dispersing apparatus to prepare a dye ink.

A mixture of 10 parts of the above-prepared dye ink and 55 parts of mineral turpentine was gradually poured into 35 parts of an aqueous solution having the composition as described hereinafter while stirring by a homomixer at 5,000 to 7,000 rpm, and the resulting mixture was stirred until it became uniform to prepare a viscous o/w emulsion type color paste.

| Composition of Aqueous Solution | |
|---|---|
| | parts |
| Water | 31 |
| Repitol G (trade name, special nonionic surface active agent, produced by Dai-ichi Kogyo Seiyaku | 3.8 |

-continued

| Composition of Aqueous Solution | |
|---|---|
| | parts |
| Co., Ltd.) | |
| Sodium trichloroacetate | 0.1 |
| Total | 34.9 |

This color paste was printed on a polyester/cotton mixed cloth (mixing ratio: 65/35) by the use of a screen printing machine, dried at 100° C. for 2 minutes, and treated with super heated steam at 175° C. for 7 minutes. Thereafter, the cloth was washed with a hot tetrachloroethylene bath containing a small amount of water and dried, and there was thus obtained a golden dyed product having excellent light fastness and wet color fastness, and free from contamination in the white background.

The dye used in this example was prepared as follows.

In accordance with the usual method, 2-chloro-4-methylsulfonylaniline was diazotized and coupled with 2-(p-hydroxyphenylethylamino)-3-cyano-4-methyl-6-ethoxyethylaminopyridine to form a dye. The dye thus formed was reacted with 2,4-difluoro-6-piperidinotriazine in the same manner as in Example 7 to obtain the desired dye. For this dye, λmax (acetone) was 469 nm.

EXAMPLE 10

A dye composition consisting of 16 parts of a disazo dye represented by the formula:

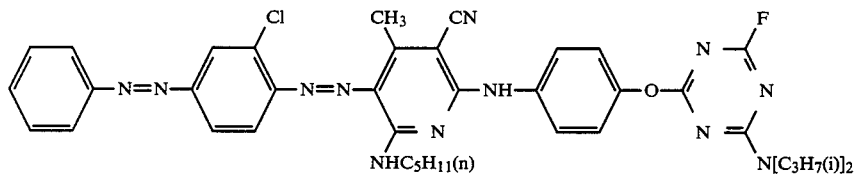

7 parts of polyoxyethylene glycol nonylphenyl ether (HLB: 13.3), 3 parts of a naphthalenesulfonic acid-formaldehyde condensate, and 74 parts of water was finely dispersed by the use of a sand grinder to prepare a dye dispersion. This dye dispersion was used to prepare a padding bath having the following composition:

| | parts |
|---|---|
| Dye dispersion | 6 |
| Tetraethylene glycol dimethyl ether | 15 |
| Water | 79 |
| Total | 100 (pH: 8.0) |

A polyester/cotton mixed cloth (mixing ratio: 65/35) was impregnated with the above-prepared padding bath, squeezed at a squeezing ratio of 45%, dried at 100° C. for 2 minutes, and fixed by dry heating at 200° C. for 1 minute. By washing the cloth with a hot ethanol bath, there was obtained a product dyed in red having excellent light fastness and wet color fastness.

The dye used in this example was prepared in the same manner as in Example 7. For this dye, λmax (acetone) was 503 nm.

EXAMPLE 11

Printing was performed in the same manner as in Example 1 except that a nylon/rayon mixed cloth (mixing ratio: 50/50) was used and the dry heating fixing temperature was 185° C. There was thus obtained a product dyed in red having good light fastness and wet color fastness.

EXAMPLE 12

Using a series of azo dyes as shown in Tables 16 to 22, printing was performed in the same manner as in Example 7.

All dyed clothes had good light fastness and wet color fastness. The hue of each dyed cloth and λmax (acetone) of each dye are shown in Tables 16 to 22.

TABLE 16

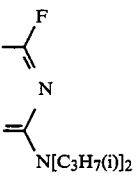

| No. | D— | —Z | —W | Hue of Dyed Cloth | λmax (acetone) (nm) |
|---|---|---|---|---|---|
| 1 | O₂N—⟨⟩— | —C₂H₄OC₂H₅ | —N[CH₂CH₂N(CH₃)₂]₂ | red-orange | 472 |
| 2 | " | —H | —NHCH₂CHCH₃<br>                OH | " | 468 |
| 3 | O₂N—⟨⟩—CN | —CH₂CH—OH<br>          CH₃ | —N(CH₂CH₂CH₂OH)₂ | deep red | 513 |

TABLE 16-continued

Structure:

$$D-N=N-\underset{\underset{NHZ}{|}}{\underset{||}{C}}\underset{CH_3}{\overset{CH_3}{C}}=\underset{CN}{C}-NH-\text{C}_6\text{H}_4-O-\text{triazine(F,W)}$$

| No. | D— | —Z | —W | Hue of Dyed Cloth | λmax (acetone) (nm) |
|---|---|---|---|---|---|
| 4 | " | —CH₂CH₂CH₂OCH₃ | —NH—CH₂—C₆H₅ | " | " |
| 5 | 3-Cl-4-CH₃-phenyl with NC | —C₅H₁₁(n) | —NH—(2,5-diOCH₃-phenyl) | red-orange | 476 |
| 6 | 3-Cl-4-CH₃-phenyl with H₃C-C(O)- | —(CH₂)₃O(CH₂)₂OH | —N(pyrrolyl) | reddish yellow | 469 |
| 7 | 3-Br-4-CH₃-phenyl with PhO-SO₂- | —CH₂CH₂CH₂OC₃H₇(i) | —N(C₃H₆CN)₂ | reddish yellow | 470 |
| 8 | 3-Cl-phenyl—N=N—(2,5-diCH₃-phenyl) | —C₄H₉(sec) | —NH₂ | red | 503 |
| 9 | (H₃C)₂N-SO₂—phenyl—N=N—(3-Cl-4-CH₃-phenyl), with NO₂ | —(CH₂)₅OH | —NHC₃H₇(i) | " | " |
| 10 | " | —CH₂CH₂OH | —N[C₄H₉(sec)]₂ | " | 512 |
| 11 | " | —(CH₂)₃O(C₂H₄O)₂CH₃ | —NH—C₆H₄—OH | " | 513 |
| 12 | 2-thiazolyl | —(CH₂)₃—[OCHCH₂(CH₃)]₂—OCH₂ | —N(CH₃)(4-OCH₃-phenyl) | orange | 469 |
| 13 | 5-methyl-2-(n-C₃H₇S)-1,3,4-thiadiazolyl | —C₄H₉(i) | —N(C₆H₅)₂ | " | " |
| 14 | " | —C₅H₁₁(sec) | —N(piperazinyl)N—CH₃ | red | 493 |
| 15 | " | —(CH₂)₂O(CH₂)₂OH | —NHC₅H₁₁(i) | " | " |
| 16 | 5-(phenylazo)-2-methyl-3-CN-thiophene | —CH₂CH₂CH₂OH | —N(morpholinyl) | reddish blue | 593 |

TABLE 16-continued

Structure:
D—N=N—[pyridine ring with CH3, CN, NHZ]—NH—[phenyl]—O—[triazine with F, W]

| No. | D— | —Z | —W | Hue of Dyed Cloth | λmax (acetone) (nm) |
|---|---|---|---|---|---|
| 17 | " | —CH2CHCH2CH2 (with OH on middle C) | —N(C2H5)2 | reddish blue | " |

TABLE 17

Structure:
D—N=N—[pyridine ring with CH3, CN, NHZ]—NH—[meta-phenyl]—O—[triazine with F, W]

| No. | D— | —Z | —W | Hue of Dyed Cloth | λmax (acetone) (nm) |
|---|---|---|---|---|---|
| 18 | 3-Cl, 4-(H3CO2S)-phenyl | —CH2CH2CH2OC2H5 | —N(H)(CH2—C(CH3)=CH—OH) | reddish yellow | 471 |
| 19 | " | —C2H5 | —NH—cyclohexyl(H) | reddish yellow | " |
| 20 | 3,5-diCl, 4-(O2N)-phenyl | —(CH2)3OC2H4OC2H5 | —N(CH2CH2OCH3)2 | bluish red | 513 |
| 21 | " | —CH(CH3)—(CH2)3—C(CH3)2—OH | —NH—[2,5-dimethylpyrrolidine with CH3, CH3] | " | 514 |
| 22 | 3-CF3, 4-(O2N)-phenyl | —C3H7(i) | —N(CH3)2 | yellowish red | 487 |
| 23 | " | —CH2CH2CH2OC2H5 | —NH2 | yellowish red | 486 |
| 24 | 3-CN, 4-(PhO2S)-phenyl | —C5H11(sec) | —N(H)(C2H4CN) | red | 492 |
| 25 | 3-CN, 4-((H5C2)2NO2S)-, 5-CF3-phenyl | —CH2CH2OH | —N(H)(C14H29(sec)) | " | 501 |

TABLE 17-continued

| No. | D— | —Z | —W | Hue of Dyed Cloth | λmax (acetone) (nm) |
|---|---|---|---|---|---|
| 26 | phenyl-N=N-(3-Br-4-methylphenyl) | —CH$_2$CH$_2$OCH$_2$CH$_2$OH | —N[C$_3$H$_7$(i)]$_2$ | " | 502 |
| 27 | (phenyl-CO-)(3-Cl-4-methylphenyl) | —CH$_2$CH$_2$CH$_2$OH | —N(H)(C$_2$H$_4$-C$_6$H$_4$-CH$_3$) | reddish yellow | 470 |
| 28 | H$_5$C$_2$-CO-(2-CN-4-methylphenyl) | —H | —N(CH$_3$)(C$_3$H$_6$N(C$_2$H$_5$)$_2$) | reddish orange | 478 |
| 29 | (2-Cl-phenyl)-N=N-(4-methylphenyl) | —CH$_2$CHOH\|CH$_3$ | —N(C$_2$H$_4$OC$_2$H$_4$OCH$_3$)$_2$ | red | 502 |
| 30 | (2-CH$_3$-phenyl)-N=N-(3,4-diCH$_3$-phenyl) | —CH$_2$CH$_2$OCH$_3$ | —N(CH$_2$-C$_6$H$_5$)$_2$ | yellowish red | 494 |
| 31 | (H$_5$C$_2$)$_2$NO$_2$S-phenyl-N=N-(2,5-diC$_2$H$_5$-4-methylphenyl) | —(CH$_2$)$_3$O(CH$_2$)$_4$OH | —N(CH$_3$)(3-CH$_3$-C$_6$H$_4$) | red | 503 |
| 32 | H$_3$CNHO$_2$S-phenyl-N=N-phenyl | —(CH$_2$)$_3$OCHCH$_2$OC$_2$H$_5$\|CH$_3$ | —N[C$_4$H$_9$(sec)]$_2$ | " | 500 |
| 33 | 2-benzothiazolyl | —C$_5$H$_{11}$(n) | —N(CH$_2$—CH=CH$_2$)$_2$ | orange | 473 |
| 34 | 2-(H$_5$C$_2$S)-5-methyl-1,3,4-thiadiazolyl | —C$_2$H$_4$OH | —N[C$_3$H$_7$(i)]$_2$ | red | 492 |

TABLE 18

[Structure: D—N=N— attached to a pyridine ring with CH3, CN, NHZ, N substituents, connected via NH to a phenyl-O-triazine system with F and W substituents]

| No. | D— | —Z | —W | Hue of Dyed Cloth | λmax (acetone) (nm) |
|-----|----|----|----|-------------------|---------------------|
| 35 | H3CO2S—C6H4— | —C2H4OC2H4OCH3 | —NHC2H4OH | yellow | 461 |
| 36 | 3-CN, 4-Cl, 5-NO2-phenyl (with CH3) | —(CH2)3OCHCH2OCH3 with CH3 | —NHC5H11(n) | bluish red | 513 |
| 37 | phenyl-N=N-(CF3, CH3)phenyl | C4H9(i) | —N[C6H13(n)]2 | bluish red | 514 |
| 38 | (n)H9C4NO2S—phenyl-N=N—(Cl, CH3)phenyl | —C2H4OH | —NH(CH2)8CH=CH(CH2)7CH3 | bluish red | 512 |
| 39 | thiazol-2-yl | —CH3 | —N[C9H19(n)]2 | orange | 469 |
| 40 | methylanthraquinonyl | —C2H4OCH3 | —N(C2H4OCH3)2 | red-brown | 486 |
| 41 | phenyl-N=N—(3-CN, 2-CH3)thienyl | —C2H4OC2H5 | —N[C3H7(n)]2 | reddish blue | 592 |

TABLE 19

[Structure: D—N=N— attached to a pyridine ring with CH3, CN, NHZ, N substituents, connected via NH—CH2— to a phenyl-O-triazine system with F and W substituents]

| No. | D- | —Z | —W | Hue of Dyed Cloth | λmax (acetone) (nm) |
|-----|----|----|----|-------------------|---------------------|
| 42 | 3-CN, 4-CH3, 6-CN-phenyl | —CH2CH2CH2OH | —N(N)C3H6CN | yellowish red | 495 |

TABLE 19-continued

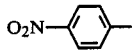

| No. | D- | -Z | -W | Hue of Dyed Cloth | λmax (acetone) (nm) |
|---|---|---|---|---|---|
| 43 | 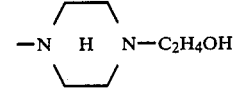 O$_2$N— | " | 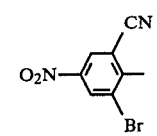 —N  N—C$_2$H$_4$OH | orange | 465 |
| 44 | 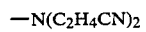 O$_2$N— (CN, Br) | " | —N(C$_2$H$_4$CN)$_2$ | bluish red | 513 |
| 45 | 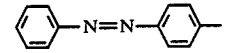 —N=N— | —CH$_2$CH$_2$OC$_2$H$_5$ | —N[C$_5$H$_{11}$(i)]$_2$ | yellowish red | 491 |
| 46 |  Cl—N=N— (Cl) | " | —N(C$_2$H$_4$OCH$_3$)(C$_2$H$_4$CN) | red | 510 |
| 47 | 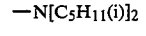 O$_2$N— (CN, CN) | —CH$_2$CH$_2$OC$_2$H$_5$ | —NH$_2$ | bluish red | 523 |
| 48 | 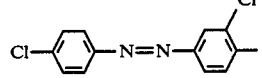 (thiazole) | —C$_4$H$_9$(n) | —NHC$_{18}$H$_{37}$(n) | orange | 472 |

TABLE 20

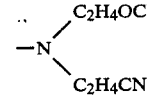

| No. | D— | -Z | —W | Hue of Dyed Cloth | λmax (acetone) (nm) |
|---|---|---|---|---|---|
| 49 | 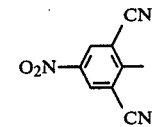 O$_2$N— (Cl) | —CH$_2$CH—OH<br>   \|<br>   CH$_3$ | —N[C$_3$H$_7$(i)]$_2$ | yellowish red | 489 |
| 50 |  (anthraquinonyl) | " | —N[C$_4$H$_9$(n)]$_2$ | red-brown | 487 |
| 51 |  (CH$_3$)$_2$NO$_2$S— (CN) | " | —NHC$_7$H$_{15}$(sec) | orange | 465 |

TABLE 20-continued

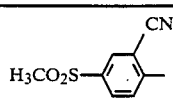

| No. | D— | —Z | —W | Hue of Dyed Cloth | λmax (acetone) (nm) |
|---|---|---|---|---|---|
| 52 | 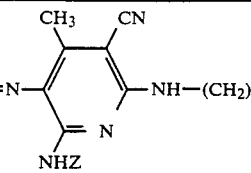 (H₃CO₂S—, CN, CH₃ substituents) | —CH₂CH₂CH₂OCH₃ | —N(CH₃)(CH₂—CH=CH₂) | red-orange | 479 |
| 53 | 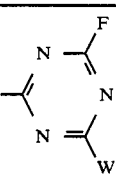 (Ph—N=N—C₆H₄—) | " | —N(C₂H₄OCH₃)₂ | yellowish red | 491 |
| 54 | 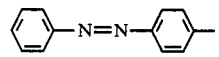 (2-Cl-C₆H₄—N=N—C₆H₄—) | —C₃H₇(i) | —N(C₂H₄OH)₂ | red | 505 |
| 55 | 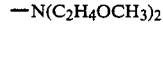 (2-C₄H₉(n)-C₆H₄—N=N—(3-Br,5-CH₃-C₆H₂)—) | —C₂H₄OH | —N(CH₃)(C₂H₄OC₂H₄OCH₃) | deep red | 511 |

TABLE 21

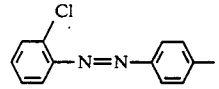

| No. | D— | —Z | —W | Hue of Dyed Cloth | λmax (acetone) (nm) |
|---|---|---|---|---|---|
| 56 |  (O₂N—, CN, Cl substituted phenyl) | —CH₂—CH(OH)CH₂CH₂CH₃ | —NH—C₆H₅ | bluish red | 514 |
| 57 | 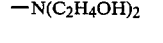 (H₃CO₂S—, Cl substituted phenyl) | " | —NHC₁₄H₂₉(sec) | reddish yellow | 469 |
| 58 | 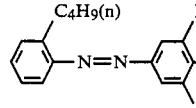 (thiazol-2-yl) | —CH₂CH₂CH₂OC₃H₇(i) | —N(C₂H₅)(C₂H₄OH) | orange | 471 |
| 59 |  (H₅C₂S—, CH₃ substituted thiadiazolyl) | " | —N(C₂H₄OH)(CH₂—CH=CH₂) | red | 492 |
| 60 | 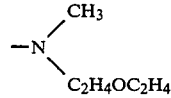 (2-SO₂N(C₂H₅)₂-C₆H₄—N=N—(2,4-(CH₃)₂-C₆H₂)—) | —CH₂CH₂CH₂OC₃H₇(i) | —N(CH₂—CH=CH₂)₂ | " | 501 |

TABLE 21-continued

Structure:
D—N=N—[pyridine ring with CH3, CN, NHZ, and NH—CH(CH3)CH2—C6H4—O—C(=N-triazine with F and W)]

| No. | D— | —Z | —W | Hue of Dyed Cloth | λmax (acetone) (nm) |
|-----|-----|-----|-----|-----|-----|
| 61 | H3CC(=O)NH—C6H4—N=N—C6H4— | —C2H4OC2H4OC2H5 | —NHC2H5 | " | " |
| 62 | 2-CF3, 4-C4H9(t)-phenyl—N=N-phenyl- | " | —N[C3H7(i)]2 | " | 504 |

TABLE 22

Structure:
D—N=N—[pyridine ring with CH3, CN, NHZ, and NH—CH(CH3)CH2CH2—C6H4—O—C(=N-triazine with F and W)]

| No. | D— | —Z | —W | Hue of Dyed Cloth | λmax (acetone) (nm) |
|-----|-----|-----|-----|-----|-----|
| 63 | 2-methyl-5-nitro-3-cyano-phenyl | —C(CH3)2—CH2OH | —N(CH3)(cyclohexyl) | red | 505 |
| 64 | 4-(phenylsulfonyl)-2-cyano-phenyl | " | —N(C2H5)(C2H4N(C2H5)2) | reddish orange | 479 |
| 65 | C6H5—N=N—C6H4— | —C6H13(i) | —N[C3H7(n)]2 | yellowish red | 491 |
| 66 | (n)H13C6NHO2S—C6H4—N=N—(3,5-diBr-4-methyl)phenyl | " | —N[C7H15(n)]2 | bluish red | 518 |
| 67 | thiazol-2-yl | —CH2CH2OC2H4OH | —N(CH3)(C2H4OH) | orange | 466 |
| 68 | 5-(n-C3H7S)-1,3,4-thiadiazol-2-yl | " | —N(pyrrolidinyl) | red | 493 |

EXAMPLE 13

A dye composition consisting of 15 parts of a disazo dye represented by the formula:

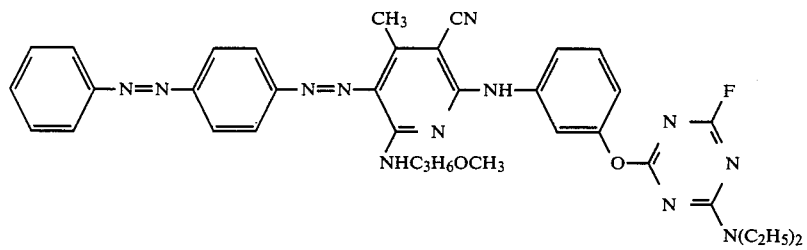

15 parts of a naphthalenesulfonic acid-formaldehyde condensate, and 70 parts of water was finely dispersed by the use of a paint shaker as finely dispersing apparatus to prepare a dye dispersion. This dye dispersion was used to prepare a printing color paste having the following composition:

|  | parts |
| --- | --- |
| Dye dispersion | 6.5 |
| 5% Aqueous sodium alginate solution | 55 |
| Polyethylene glycol dimethyl ether having an average molecular weight of 400 | 9 |
| Water | 29.5 |
| Total | 100 (pH 8.0) |

The thus prepared printing color paste was printed on a polyester/cotton mixed cloth (mixing ratio: 65/35) by the use of a screen printing machine, was subjected to intermediate drying at 80° C. for 3 minutes, and was fixed by dry heating at 125° C. for 90 seconds. The cloth was then washed with water, and was subjected to soaping using a cleaning liquid containing 2 g/l of a nonionic surface active agent (Scorerol #900 (trade name), produced by Kao Sekken Co., Ltd.) at 80° C. for 20 minutes at a bath ratio of 1:30. There was thus obtained a product dyed in yellowish red having excellent light fastness and wet color fastness.

The dye used in this example was prepared as follows.

In accordance with the usual method, 4-aminoazobenzene was diazotized and coupled with 2-(γ-methoxypropylamino)-3-cyano-4-methyl-6-(m-hydroxyanilino)pyridine to form a dye. A mixture of 5.07 g of the above prepared dye, 2.1 g of 2,4-difluoro-6-(diethyl-)aminotriazine, 1.0 g of triethylamine, and 1.0 g of anhydrous potassium carbonate was added to 100 ml of acetone and heated at reflux for 3 hours to achieve a condensation reaction. The reaction solution was then added dropwise to 1,000 ml of water, and the precipitate thus formed was separated by filtration, washed with water, and dried at room temperature to obtain 6.4 g of red powder of the dye represented by the above described formula. For this dye, λmax (acetone) was 490 nm.

EXAMPLE 14

A dye composition consisting of 15 parts of a monoazo dye represented by the formula:

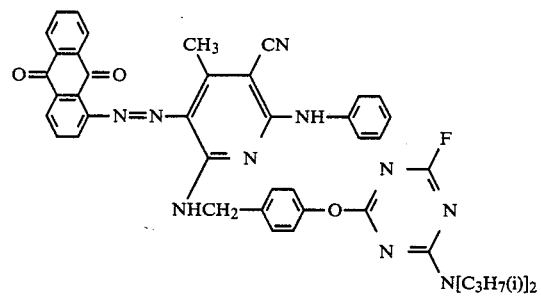

10 parts of a Pluronic surface active agent, Pluronic L64 (trade name, produced by Asahi Denka Kogyo Co., (Ltd.), and 75 parts of water was finely dispersed by the use of a sand grinder as a finely dispersing apparatus to prepare a dye dispersion. This dye dispersion was used to prepare a printing color paste having the following composition:

|  | parts |
| --- | --- |
| Dye dispersion | 7 |
| 5% Aqueous sodium alginate solution | 55 |
| Diacetate of polypropylene glycol having an average molecular weight of 300 | 10 |
| Polyethylene glycol diglycidyl ether having an average molecular weight of 200 | 3 |
| Water | 25 |
| Total | 100 (pH: 6.5) |

The thus prepared printing color paste was printed on a cotton broad (cotton yarn number: 40) which had been subjected to silket processing, by the use of a screen printing machine, was subjected to intermediate drying at 80° C. for 3 minutes, and was treated using super heated steam at 185° C. for 7 minutes.

Thereafter, a washing processing was performed in the same manner as in Example 13, and there was thus obtained a product dyed in reddish brown having excellent light fastness and wet color fastness.

The dye used in this example was prepared as follows.

In accordance with the usual method, 1-aminoanthraquinone was diazotized and coupled with 2-anilino-3-cyano-4-methyl-6-(4-hydroxybenzylamino)pyridine to form a dye. The dye thus formed was reacted with 2,4-difluoro-6-(N,N-diisopropylamino)triazine in N-methyl-2-pyrrolidone by the use of triethylamine as an acid-removing agent to obtain the desired dye. For this dye, λmax (acetone) was 484 nm.

EXAMPLE 15

A dye composition consisting of 10 parts of a monoazo dye represented by the formula:

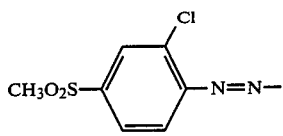

2 parts of polyoxyethylene glycol nonylphenyl ether (HLB: 8.9), and 88 parts of diethylene glycol diacetate was ground by the use of a paint conditioner as a finely dispersing apparatus to prepare a dye ink.

A mixture of 10 parts of the above prepared dye ink and 55 parts of mineral turpentine was gradually poured into 35 parts of an aqueous solution having the composition as described hereinafter while stirring by a homomixer at 5,000 to 7,000 rpm, and the resulting mixture was then stirred until it became uniform to obtain a viscous o/w emulsion color paste.

| Composition of Aqueous Solution | |
| --- | --- |
|  | parts |
| Water | 31 |
| Repitol G (trade name, special nonionic surface active agent, produced by Dai-ichi Kogyo Seiyaku Co., Ltd.) | 3.8 |
| Sodium trichloroacetate | 0.1 |
| Total | 34.9 |

The thus prepared color paste was printed on a polyester/cotton mixed cloth (mixing ratio: 65/35) by the use of a screen printing machine, dried at 100° C. for 2 minutes, and treated with super heated steam at 175° C. for 7 minutes. The cloth was washed with a hot tetrachloroethylene bath containing a small amount of water and dried, and there was thus obtained a golden dyed product having excellent light fastness and wet color fastness, and free from contamination in the white background.

The dye used in this example was prepared as follows.

In accordance with the usual method, 2-chloro-4-methylsulfonylaniline was diazotized and coupled with 2-amino-3-cyano-4-methyl-6-(p-hydroxyanilino)pyridine to form a dye. The dye thus formed was reacted at reflux with 2,4-dichloro-6-(n)-hexylaminotriazine in dioxane in the presence of tri-n-butylamine as an acid-removing agent for 3 hours. At the end of the time, the reaction solution was cooled, and crystals separated were collected by filtration to obtain the desired dye. For this dye, λmax (acetone) was 467 nm.

EXAMPLE 16

A dye composition consisting of 16 parts of a disazo dye represented by the formula:

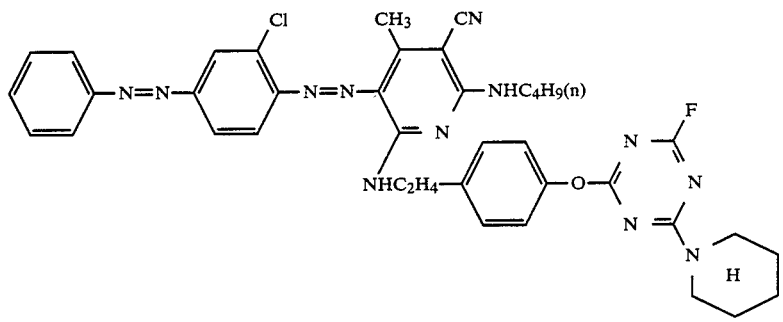

7 parts of polyoxyethylene glycol nonylphenyl ether (HLB: 13.3), 3 parts of a naphthalenesulfonic acid-formaldehyde condensate, and 74 parts of water was finely dispersed by the use of a sand grinder to prepare a dye dispersion. This dye was used to prepare a padding bath having the following composition:

|  | parts |
| --- | --- |
| Dye dispersion | 6 |
| Tetraethylene glycol dimethyl ether | 15 |
| Water | 79 |
| Total | 100 (pH: 8.0) |

A polyester/cotton mixed cloth (mixing ratio: 65/35) was impregnated with the above prepared padding bath, squeezed at a squeezing ratio of 45%, dried at 100° C. for 2 minutes, and fixed by dry heating at 200° C. for 1 minute. The cloth was washed with a hot ethanol bath, and there was thus obtained a product dyed in red having excellent light fastness and wet color fastness.

The dye used in this example was prepared according to the method as described in Example 13. For this dye, λmax (acetone) was 503 nm.

EXAMPLE 17

Printing was performed in the same manner as in Example 13 except that a nylon/rayon mixed cloth (mixing ratio: 50/50) was employed and the dry heating fixing temperature was 185° C. There was obtained a product dyed in red having good light fastness and wet color fastness.

EXAMPLE 18

Using a series of azo dyes as shown in Tables 23 to 30, printing was performed in the same manner as in Example 13.

All dyed clothes had good light fastness and wet color fastness. The hue of each dyed cloth and λmax (acetone) of each dye are shown in Tables 23 to 30.

TABLE 23

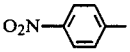

| No. | D— | —Z | —W | Hue of Dyed Cloth | λmax (acetone) (nm) |
|---|---|---|---|---|---|
| 1 | $O_2N$—⌬—  (4-nitrophenyl) | —H | —N($C_2H_5$)$_2$ | red orange | 473 |
| 2 | " | —CH$_2$—⌬ (benzyl) | —NHC$_2$H$_4$OH | " | 474 |
| 3 | " | —C$_2$H$_4$OCH$_3$ | —NHC$_2$H$_4$—⌬—CH$_3$ (3-methylphenyl) | " | " |
| 4 | 2-methyl-5-nitro-benzonitrile group (O$_2$N, CN substituted phenyl) | —CH$_2$—CH=CH$_2$ | —N(CH$_2$—⌬)$_2$ | deep red | 514 |
| 5 | " | —CH$_2$—CH(OH)—CH$_3$ | —N[C$_3$H$_7$(i)]$_2$ | " | " |
| 6 | 2-methyl-5-nitro-benzonitrile group | —C$_3$H$_7$(n) | —N(H)(C$_2$H$_5$) | deep red | 514 |
| 7 | 3-chloro-4-methyl-benzonitrile group (NC, Cl substituted) | —C$_3$H$_6$OCH$_3$ | —N(C$_2$H$_5$)(C$_2$H$_4$N(C$_2$H$_5$)$_2$) | orange | 477 |
| 8 | " | —C$_2$H$_4$OC$_2$H$_4$OCH$_3$ | —N(C$_2$H$_4$OCH$_3$)$_2$ | " | " |
| 9 | 3-chloro-4-methyl-acetophenone group (H$_3$C.CO, Cl substituted) | —C$_3$H$_6$OC$_2$H$_4$OH | —N(CH$_3$)(⌬) | reddish yellow | 470 |
| 10 | 3-bromo-4-methyl-phenylsulfonyl (⌬O$_2$S, Br substituted) | —C$_4$H$_9$(n) | —N(CH$_2$—CH=CH$_2$)$_2$ | gold | 471 |
| 11 | Cl—⌬—N=N—⌬(2,4,6-trimethylphenyl with CH$_3$, CH$_3$) | —C$_3$H$_6$OC$_3$H$_7$(i) | —N⟨piperazine⟩N—CH$_3$ | red | 504 |
| 12 | Cl—⌬—N=N—⌬(2,4,6-trimethylphenyl with CH$_3$, CH$_3$) | —C$_2$H$_4$OH | —N(C$_2$H$_4$CN)$_2$ | red | 504 |

TABLE 23-continued

| No. | D— | —Z | —W | Hue of Dyed Cloth | λmax (acetone) (nm) |
|---|---|---|---|---|---|
| 13 | $H_5C_2$—N($NO_2S$)—C$_6H_4$—N=N—C$_6H_4$— (with $H_5C_2$) | —$C_2H_4OC_2H_4OH$ | —N(morpholine)O | " | 503 |
| 14 | 2,4-Cl$_2$-C$_6H_3$-N=N-C$_6H_3$(3-CH$_3$)— | " | —NHC$_3$H$_7$(i) | deep red | 519 |
| 15 | 2-thiazolyl | —$C_3H_6OH$ | —N(n-C$_3$H$_7$)$_2$ | orange | 471 |
| 16 | " | —C$_6$H$_5$ | —N(i-C$_3$H$_7$)$_2$ | " | " |
| 17 | $H_5C_2S$—(thiadiazolyl)—CH$_3$ | —C$_4$H$_9$(i) | —NHC$_6$H$_{13}$(sec) | red | 495 |
| 18 | C$_6$H$_5$—N=N—(3-CN, 2-CH$_3$-thienyl)— | —C$_3$H$_6$—O—(CHCH$_2$—OCH$_3$)$_2$ with CH$_3$ | —NH$_2$ | reddish blue | 595 |
| 19 | " | —C$_4$H$_8$OH | —N(C$_2$H$_5$)$_2$ | " | " |

TABLE 24

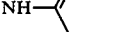

| No. | D— | —Z | —W | Hue of Dyed Cloth | λmax (acetone) (nm) |
|---|---|---|---|---|---|
| 20 | $O_2N$—C$_6$H$_4$— | —$C_2H_4OH$ | —NH—(3-CN-C$_6$H$_4$) | red orange | 473 |

TABLE 24-continued

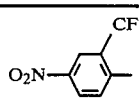

| No. | D— | —Z | —W | Hue of Dyed Cloth | λmax (acetone) (nm) |
|---|---|---|---|---|---|
| 21 | 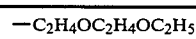 (4-methyl-3-CF$_3$-nitrobenzene: O$_2$N-, CF$_3$) | —C$_2$H$_4$OC$_2$H$_4$OC$_2$H$_5$ | —N(C$_2$H$_4$CN)$_2$ | yellowish red | 489 |
| 22 | " | —H |  —N(CH$_2$CH$_2$CH$_2$OH)(CH$_2$–C$_6$H$_5$) | yellowish red | " |
| 23 |  (H$_3$CO$_2$S–, Cl, CH$_3$) | 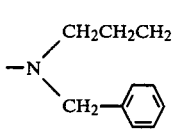 —C$_6$H$_5$ | 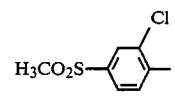 —N(C$_2$H$_4$OCH$_3$)(C$_2$H$_4$CN) | reddish yellow | 472 |
| 24 |  (2,6-Cl, 4-NO$_2$, 3-CH$_3$) | —C$_6$H$_{13}$(n) | 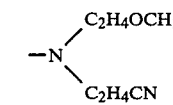 —NH–(2,5-dimethoxyphenyl) | red-brown | 490 |
| 25 | 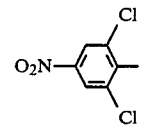 (O$_2$N–, CN, CH$_3$, Br) | —CH$_2$–C$_6$H$_5$ |  piperidino | bluish red | 517 |
| 26 | 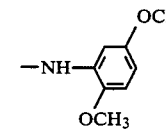 (C$_6$H$_5$–N=N–, Br, CH$_3$) | —C$_5$H$_{11}$(n) | 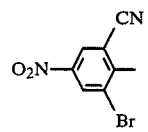 —N(C$_6$H$_5$)$_2$ | red | 502 |
| 27 | 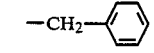 (C$_6$H$_5$–CO–C$_6$H$_4$–) | —C$_2$H$_4$OC$_2$H$_4$OH | —N(CH$_3$)$_2$ | yellow | 464 |
| 28 | 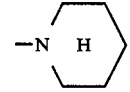 (2,6-Cl$_2$–C$_6$H$_3$–N=N–C$_6$H$_4$–) | 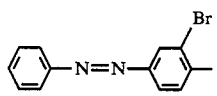 —C(CH$_3$)$_2$CH$_2$OH |  pyrrolidino | red | 509 |
| 29 | 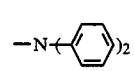 (2-CH$_3$–C$_6$H$_4$–N=N–2,4-(CH$_3$)$_2$–C$_6$H$_3$–) | —C$_2$H$_4$OC$_2$H$_5$ | —N[C$_4$H$_9$(sec)]$_2$ | yellowish red | 495 |
| 30 | 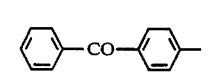 (2-CH$_3$–C$_6$H$_4$–N=N–2,6-(CH$_3$)$_2$–C$_6$H$_3$–) | " |  morpholino | yellowish red | 494 |

TABLE 24-continued

| No. | D— | —Z | —W | Hue of Dyed Cloth | λmax (acetone) (nm) |
|---|---|---|---|---|---|
| 31 | H9C4(n)(H)N-NO2S—C6H3—N=N—C6H2(C2H5)2(CH3) | —C2H5 | " | deep red | 503 |
| 32 | " | —C3H6OC3H7 | —N(pyrrolidine with 2,5-diCH3)H | deep red | " |
| 33 | H3CNHO2S—C6H4—N=N—C6H3(Cl)(CH3) | —C3H6OH | —NHC7H15(n) | deep red | 510 |
| 34 | H3CNHO2S—C6H4—N=N—C6H3(Cl)(CH3) | —C4H8OH | —N(C2H4OCH3)2 | deep red | 510 |
| 35 | benzothiazol-2-yl | —H | —N(C9H19)2 | orange | 475 |
| 36 | 1-methylanthraquinon-yl | —CH2—CH=CH2 | —N(CH2—CH=CH2)2 | red-brown | 488 |

TABLE 25
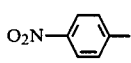
| No. | D— | —Z | —W | Hue of Dyed Cloth | λmax (acetone) (nm) |
|---|---|---|---|---|---|
| 37 | 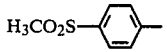 | —C$_2$H$_4$OH | —N[C$_3$H$_6$N(CH$_3$)$_2$]$_2$ | orange | 473 |
| 38 | 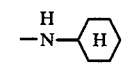 | " | 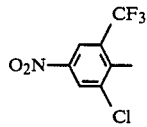 | yellow | 463 |
| 39 | 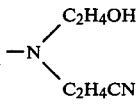 | " | 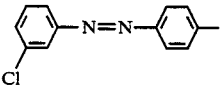 | red-brown | 491 |
| 40 | 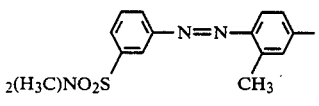 | —C$_2$H$_4$OC$_2$H$_5$ | —N(CH$_2$—CH=CH$_2$)$_2$ | red | 503 |
| 41 | 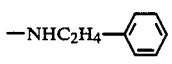 | —CH$_3$ | —NHC$_2$H$_4$—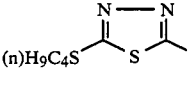 | " | 506 |
| 42 | 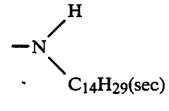 | —C$_3$H$_6$OH | 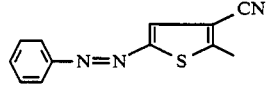 | " | 494 |
| 43 | 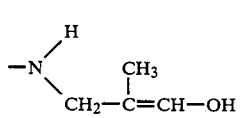 | —C$_3$H$_7$(i) | $-\text{N}\begin{smallmatrix}\text{H}\\\text{CH}_2-\underset{\text{CH}_3}{\text{C}}=\text{CH}-\text{OH}\end{smallmatrix}$ | reddish blue | 595 |

TABLE 26

Structure:

D—N=N—[pyridine ring with CH₃, CN, NHZ substituents]—NH—CH₂—[phenyl]—O—[triazine with F and W]

| No. | D— | —Z | —W | Hue of Dyed Cloth | λmax (acetone) (nm) |
|---|---|---|---|---|---|
| 44 | 3-Cl, 4-(O₂N)-phenyl (with CH₃) — shown as O₂N-[phenyl with Cl]- | —C₄H₉(i) | —N(C₂H₄OCH₃)(CH₂—CH=CH₂) | yellowish red | 488 |
| 45 | 3-Cl, 4-CH₃-phenyl with NC- substituent | —H | —NH—[phenyl]—CH₃ | orange | 478 |
| 46 | Cl-[phenyl]—N=N—[phenyl]— | —C₂H₄OCH₃ | —N(C₂H₅)₂ | red | 504 |
| 47 | Br-[phenyl]—N=N—[phenyl with C₄H₉(n)]— | —CH₂—CH=CH₂ | —N[C₃H₇(i)]₂ | red | 508 |
| 48 | H₂NO₂S—[phenyl]—N=N—[phenyl with C₃H₇(n)]— | —C₃H₆OCH₃ | —N[C₅H₁₁(n)]₂ | red | 510 |
| 49 | O₂N-[phenyl with 2 CN groups]— | —[phenyl] | —N[CH=CH—S—CH=CH] (thiazine ring) | bluish red | 524 |
| 50 | [thiazole ring]— | —C₂H₄OC₃H₇(i) | —NHC₂H₄—[phenyl]—CH₃ | orange | 471 |

TABLE 27

Structure:

D—N=N—[pyridine ring with CH₃, CN, NHZ substituents]—NH—(CH₂)₂—[phenyl]—O—[triazine with F and W]

| No. | D— | —Z | —W | Hue of Dyed Cloth | λmax (acetone) (nm) |
|---|---|---|---|---|---|
| 51 | O₂N-[phenyl with CN]— | —C₂H₄OC₃H₇ | —N[C₉H₁₉(n)]₂ | deep red | 514 |

TABLE 27-continued

[Structure: pyridine core with CH3, CN, NHZ, and D—N=N substituents, linked via NH—(CH2)2—phenyl—O— to a triazine ring bearing F and W substituents]

| No. | D— | —Z | —W | Hue of Dyed Cloth | λmax (acetone) (nm) |
|---|---|---|---|---|---|
| 52 | 1-methylanthraquinon-2-yl | phenyl | —N(CH2CH2CH2OH)2 | red-brown | 488 |
| 53 | 3,4-dimethyl-(N,N-di-n-propyl)sulfamoylphenyl with NO2 | —CH2—phenyl | —NH(CH2)8CH=CH(CH2)7CH3 | yellow | 462 |
| 54 | 2,4-dimethyl-6-(phenylazo)phenyl | —C2H4OC2H4OH | —N(pyrrolidinyl)H | red | 507 |
| 55 | 2-(n-C4H9)-4-(phenylazo)phenyl | —CH2—CH=CH2 | —N[C3H7(n)]2 | red | 508 |
| 56 | 2-methylthio-5-methyl-1,3,4-thiadiazolyl (H3CS, CH3) | —CH2—phenyl | —N(H)(C2H4CN) | red | 493 |
| 57 | 4-(4-acetamidophenylazo)phenyl (H3CCNH—C6H4—N=N—C6H4—) | —C3H6OH | —N[C4H9(n)]2 | red | 508 |
| 58 | 2-(SO2NHC3H7(i))-phenyl-azo-2,4-dimethylphenyl | —C3H6OH | —NH2 | deep red | 510 |

TABLE 28
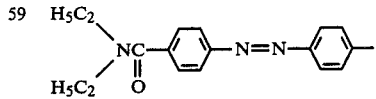
| No. | D— | —Z | —W | Hue of Dyed Cloth | λmax (acetone) (nm) |
|---|---|---|---|---|---|
| 59 |  | —C$_6$H$_{13}$(n) | 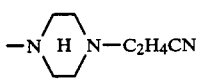 | red | 502 |
| 60 | 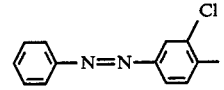 | —C$_2$H$_4$OH | —N(CH$_2$—CH=CH$_2$)$_2$ | " | 505 |
| 61 |  | —CH$_2$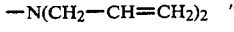 | —N(C$_2$H$_5$)$_2$ | reddish yellow | 470 |
| 62 | 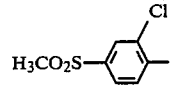 | —C$_3$H$_6$OH | 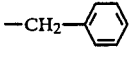 | orange | 472 |
| 63 |  | —C$_4$H$_8$OH | —N(C$_2$H$_4$OH)$_2$ | reddish blue | 595 |
TABLE 29
| No. | D— | —Z | —W | Hue of Dyed Cloth | λmax (acetone) (nm) |
|---|---|---|---|---|---|
| 64 |  | —C$_3$H$_6$O—CCH$_2$OCH$_3$ (with CH$_3$ and H) | —N[C$_3$H$_7$(n)]$_2$ | deep red | 514 |
| 65 | 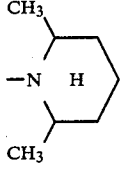 | —C$_2$H$_4$OC$_2$H$_4$OCH$_3$ | —N[C$_6$H$_{13}$(sec)]$_2$ | yellowish red | 492 |

TABLE 29-continued

[Structure shown at top of table with D—N=N— group, CH₃, CN, NHZ substituents on pyridine ring, NH—CHCH₂CH₂— linker with CH₃ branch, phenyl-O—C(=N)— triazine with F, N, W substituents]

| No. | D— | —Z | —W | Hue of Dyed Cloth | λmax (acetone) (nm) |
|---|---|---|---|---|---|
| 66 | 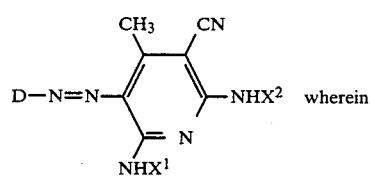 | —C₃H₇(i) | 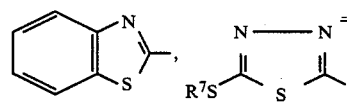 | red-brown | 510 |
| 67 | 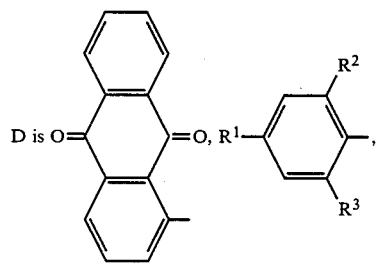 | —CH₃ | —N(C₂H₄CN)₂ | orange | 471 |
| 68 | 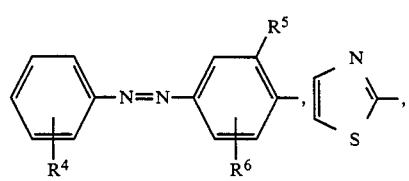 | —C₂H₄OH | —N(C₃H₆CN)₂ | red | 496 |

While the invention has been described in detail and with reference to specific embodiments thereof, it will be apparent to one skilled in the art that various changes and modifications can be made therein without departing from the spirit and scope thereof.

What is claimed is:

1. A diaminopyridine-based azo dye for cellulose-containing fibers, represented by the following formula:

[Structure: D—N=N— pyridine with CH₃, CN, NHX², NHX¹ substituents]   wherein

D is

[Structure: anthraquinone (O=...=O)],

[Structure: phenyl with R¹, R², R³ substituents],

[Structure: phenyl-N=N-phenyl with R⁴, R⁵, R⁶ substituents and thiazole],

[Structure: benzothiazole],

[Structure: R⁷S—C(=N—N=)—S—C with tautomer form],

[Structure: phenyl-N=N-phenyl with R⁵, R⁶, R⁸, R⁹ substituents], or

[Structure: phenyl-N=N-thiophene with CN, CH₃ substituents]; and one of X¹ and X² is $-(A)_n-$ [Structure: phenyl-O-C(=N)- triazine with F, NY¹Y²]

and the other is hydrogen, phenyl, benzyl, allyl, or alkyl which are unsubstituted or substituted by hydroxyl or lower alkoxy (wherein
A is methylene, ethylene, propylene, or 1,3-butylene;
n is 0 or 1;
Y¹ and Y², which are the same or different, are hydrogen, alkyl, alkenyl, cyclohexyl, aryl, or aralkyl which are unsubstituted or substituted by cyano, hydroxy, lower alkoxy, or dialkylamino, or Y¹ and Y² together form a 5- or 6-membered heterocyclic ring (NY¹Y²) containing one nitrogen, the total number of carbon atoms of $Y^1$ and $Y^2$ being 18 or less:

$R^1$ is nitro, cyano, methylsulfonyl, phenylsulfonyl, mono-lower alkylaminosulfonyl, di-lower alkylaminosulfonyl, acetyl, or benzoyl;

$R^2$ and $R^3$, which are the same or different, are hydrogen, trifluoromethyl, halogen, or cyano;

$R^4$ is hydrogen, lower alkyl, mono- or di-lower alkylaminosulfonyl, mono/or di-lower alkylcarbamoyl, or acetylamino;

$R^5$ and $R^6$, which are the same or different, are hydrogen, halogen, or lower alkyl;

$R^7$ is lower alkyl;

$R^8$ is trifluoromethyl, or halogen; and $R^9$ is hydrogen, or halogen).

2. The dye as claimed in claim 1, represented by the following formula:

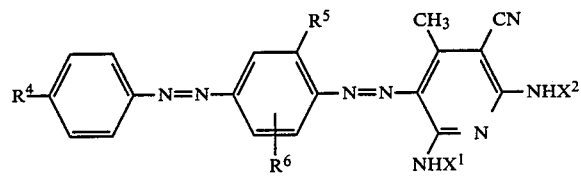

wherein

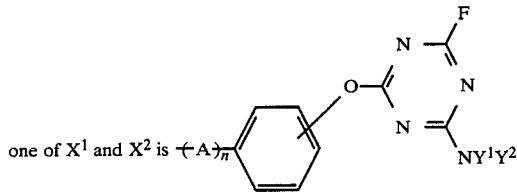

and the other is hydrogen, phenyl, benzyl, allyl, or alkyl which are unsubstituted or substituted by hydroxyl, or lower alkoxy (wherein A is methylene, ethylene, propylene, or 1,3-butylene;
n is 0 or 1;

$Y^1$ and $Y^2$, which are the same or different, are hydrogen, alkyl, alkenyl, cyclohexyl, aryl, or aralkyl which are unsubstituted or substituted by cyano, hydroxyl, lower alkoxy, or dialkylamino, or $Y^1$ and $Y^2$ together form a 5- or 6-membered heterocyclic ring ($NY^1Y^2$) containing one nitrogen, the total number of carbon atoms of $Y^1$ and $Y^2$ being 18 or less;

$R^4$ is hydrogen, lower alkyl, mono- or di-lower alkylaminosulfonyl, mono- or di-lower alkylcarbamoyl, or acetylamino; and $R^5$ and $R^6$, which are the same or different, are hydrogen, halogen, or lower alkyl).

3. The dye as claimed in claim 1, represented by the following formula:

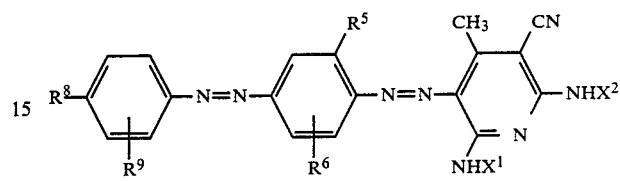

wherein

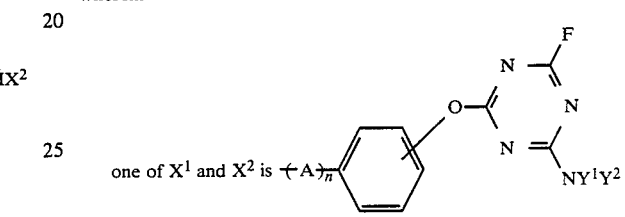

and the other is hydrogen, phenyl, benzyl, allyl, or alkyl which are unsubstituted or substituted by hydroxyl or lower alkoxy (wherein A is methylene, ethylene, propylene, or 1,3-butylene;
n is 0 or 1;

$Y^1$ and $Y^2$, which are the same or different, are hydrogen, alkyl, alkenyl, cyclohexyl, aryl, or aralkyl which are unsubstituted or substituted by cyano, hydroxyl, lower alkoxy, or dialkylamino, or $Y^1$ and $Y^2$ together form a 5- or 6-membered heterocyclic ring ($NY^1Y^2$) containing one nitrogen, the total number of carbon atoms of $Y^1$ and $Y^2$ being 18 or less;

$R^5$ and $R^6$, which are the same or different, are hydrogen, halogen, or lower alkyl;

$R^8$ is trifluoromethyl, or halogen; and
$R^9$ is hydrogen, or halogen).

* * * * *